United States Patent
Chen et al.

(10) Patent No.: US 12,436,914 B2
(45) Date of Patent: Oct. 7, 2025

(54) ACCELERATION UNIT, ACCELERATION ASSEMBLY, ACCELERATION DEVICE, AND ELECTRONIC DEVICE

(71) Applicant: Anhui Cambricon Information Technology Co., Ltd., Hefei (CN)

(72) Inventors: Shuai Chen, Hefei (CN); Kai Ye, Hefei (CN); Ao Wang, Hefei (CN); Haolan Peng, Hefei (CN); Kezhong Li, Hefei (CN); Jingzi Gu, Hefei (CN); Fan Liang, Hefei (CN)

(73) Assignee: ANHUI CAMBRICON INFORMATION TECHNOLOGY CO., LTD., Hefei (CN)

( * ) Notice: Subject to any disclaimer, the term of this patent is extended or adjusted under 35 U.S.C. 154(b) by 213 days.

(21) Appl. No.: 18/003,670

(22) PCT Filed: Aug. 30, 2021

(86) PCT No.: PCT/CN2021/115229
§ 371 (c)(1),
(2) Date: Dec. 28, 2022

(87) PCT Pub. No.: WO2022/057600
PCT Pub. Date: Mar. 24, 2022

(65) Prior Publication Data
US 2024/0028553 A1    Jan. 25, 2024

(30) Foreign Application Priority Data
Sep. 15, 2020 (CN) .......................... 202010969307.8
Sep. 15, 2020 (CN) .......................... 202010970850.X

(51) Int. Cl.
*G06F 15/17*    (2006.01)
*G06F 15/167*   (2006.01)
*G06F 15/173*   (2006.01)

(52) U.S. Cl.
CPC .......... *G06F 15/173* (2013.01); *G06F 15/167* (2013.01)

(58) Field of Classification Search
None
See application file for complete search history.

(56) References Cited

U.S. PATENT DOCUMENTS

2017/0116157 A1    4/2017  Fong et al.
2020/0387771 A1*  12/2020  Nair ...................... G06F 9/3895
2023/0334613 A1*  10/2023  Daxer ....................... G06T 1/60

FOREIGN PATENT DOCUMENTS

CN    102541804 A    7/2012
CN    104391820 A    3/2015
(Continued)

OTHER PUBLICATIONS

PCT/CN2021/115229- International Search Report, mailed on Nov. 25, 2021, 7 pages.
(Continued)

*Primary Examiner* — Scott C Sun
(74) *Attorney, Agent, or Firm* — Getech Law LLC; Jun Ye

(57) ABSTRACT

The present disclosure relates to an acceleration unit, an acceleration assembly, an acceleration device, and an electronic device. The application unit is included in a combined processing device. The combined processing apparatus further includes an interconnection interface and other processing device. The application unit interacts with other processing device to jointly complete a computing operation specified by a user. The combined processing device further includes a storage device. The storage device is connected to the acceleration unit and other processing devices, respectively. The storage device is used for data services of the acceleration unit and other processing devices. With the help (Continued)

of the content of the present disclosure, high-speed processing of massive data may be realized.

33 Claims, 32 Drawing Sheets

(56) References Cited

FOREIGN PATENT DOCUMENTS

| | | |
|---|---|---|
| CN | 110413561 A | 11/2019 |
| CN | 212846785 U | 3/2021 |
| CN | 212846786 U | 3/2021 |

OTHER PUBLICATIONS

CN202010970850.X—First Office Action mailed on Oct. 19, 2024, 20 pages.
CN202010969307.8—First Office Action mailed on Oct. 17, 2024, 16 pages.
CN202010969307.8—Second Office Action mailed on Mar. 28, 2025, 10 pages.
CN202010970850.X—Second Office Action mailed on Mar. 28, 2025, 14 pages.

* cited by examiner represented as ↑

801

ACCELERATION UNIT, ACCELERATION ASSEMBLY, ACCELERATION DEVICE, AND ELECTRONIC DEVICE

CROSS REFERENCE OF RELATED APPLICATION

This is a 371 of International Application No. PCT/CN2021/115229, filed Aug. 30, 2021 which claims priority to Chinese Patent Application No. 202010969307.8 with the title of "ACCELERATION UNIT AND ELECTRONIC DEVICE" filed on Sep. 15, 2020; and the present application claims priority to Chinese Patent Application No. 202010970850.X with the title of "ACCELERATION ASSEMBLY, ACCELERATION DEVICE, AND ELECTRONIC DEVICE" filed on Sep. 15, 2020.

TECHNICAL FIELD

The present disclosure generally relates to a field of processor technology. More specifically, the present disclosure relates to an acceleration unit, an acceleration assembly, an acceleration device, a board card, and an electronic device.

BACKGROUND

At present, with the rapid development of artificial intelligence and machine learning, the demand for ultra-high-performance processors will increase in the future, and the era of big data puts forward higher demand for data processing. A high-performance processor and a cluster are required to complete the real-time processing of massive data, and complete the training and inference of a complex model within the specified time. ASIC (Application Specific Integrated Circuit) is a dedicated acceleration chip used to train a deep neural network. The ASIC may complete work in less time and use much less data center infrastructure than a non-parallel processing supercomputer.

However, a single ASIC may not process massive data. In order to obtain stronger computing power, a plurality of ASIC acceleration chips are used in a common solution. However, for a multi-card network formed by interconnecting a plurality of ASICs, ultra-high data throughput puts a great challenge to the data transmission bandwidth of the ASIC. Therefore, how to design an interconnection scheme between chips to improve the computing power of the whole system and achieve efficient processing of massive data has become a key technical problem for creating a high-performance processor cluster.

SUMMARY

In order to solve the above technical problems, the present disclosure provides an acceleration unit, an acceleration assembly, an acceleration device, a board card, and an electronic device that are capable of improving computing power.

A first aspect of the present disclosure provides an acceleration unit including M acceleration cards of this acceleration unit. Each acceleration card of this acceleration unit includes an internal connection port, and each acceleration card of this acceleration unit is connected to other acceleration cards of this acceleration unit through the internal connection port, where the M acceleration cards of this acceleration unit logically form an acceleration card matrix with a scale of L*N, and L and N are integers not less than 2.

A second aspect of the present disclosure provides an acceleration assembly including a plurality of acceleration units. Each acceleration unit includes M acceleration cards of this acceleration unit, each acceleration card of this acceleration unit includes an internal connection port, and each acceleration card of this acceleration unit is connected to other acceleration cards of this acceleration unit through the internal connection port. The M acceleration cards of this acceleration unit logically form an acceleration card matrix with a scale of L*N, and L and N are integers not less than 2. At least one of the M acceleration cards of this acceleration unit includes an external connection port, and the acceleration units are connected through the external connection port.

A third aspect of the present disclosure provides an acceleration device including a plurality of acceleration units. Each acceleration unit includes M acceleration cards of this acceleration unit, each acceleration card of this acceleration unit includes an internal connection port, and each acceleration card of this acceleration unit is connected to other acceleration cards of this acceleration unit through the internal connection port. The M acceleration cards of this acceleration unit logically form an acceleration card matrix with a scale of L*N, and L and N are integers not less than 2. At least one of the M acceleration cards of this acceleration unit includes an external connection port, and the acceleration units are connected through the external connection port. The plurality of acceleration units are logically in a multi-layer structure, where each layer includes an acceleration unit. The acceleration cards of each acceleration unit are connected to acceleration cards of other acceleration units through the external connection port, and a last acceleration unit is connected to a first acceleration unit, so that the plurality of acceleration units are connected end to end to form a ring structure.

A fourth aspect of the present disclosure provides an acceleration device including a plurality of acceleration assemblies described above, and the plurality of acceleration assemblies are connected to each other through idle external connection ports.

A fifth aspect of the present disclosure provides an electronic device including the above acceleration unit, the acceleration assembly, or the acceleration device.

In the scheme of the present disclosure, the acceleration unit is composed of a plurality of acceleration cards. For the plurality of acceleration cards, each acceleration card is connected to other acceleration card through an internal connection port of the acceleration card to realize the interconnection between the acceleration cards. Such a setup may effectively improve the computing power of the acceleration unit, which is conducive to improving the speed of processing massive data. Besides, for the acceleration assembly and the acceleration device, the interconnection between acceleration units may make the time delay of the whole system minimal, which may meet the real-time requirement of the system to the maximum extent while processing massive data, and is conducive to improving the computing power of the whole system as well as realizing the purpose of high-speed processing of massive data by the system.

BRIEF DESCRIPTION OF DRAWINGS

By reading the following detailed description with reference to accompanying drawings, the above-mentioned and other objects, features and technical effects of the exemplary embodiments of the present disclosure will become easier to understand. In the accompanying drawings, several embodiments of the present disclosure are shown in an exemplary but not restrictive manner, and the same or corresponding reference numerals indicate the same or corresponding parts of the embodiments.

DETAILED DESCRIPTION OF EMBODIMENTS

Technical solutions in embodiments of the present disclosure will be described clearly and completely hereinafter with reference to accompanied drawings in the embodiments of the present disclosure. Obviously, embodiments to be described are merely some rather than all embodiments of the present disclosure. All other embodiments obtained by those of ordinary skill in the art based on the embodiments of the present disclosure without creative efforts shall fall within the protection scope of the present disclosure.

A plurality of embodiments of the present disclosure are described in details below in reference to the drawings.

Figure 1A:
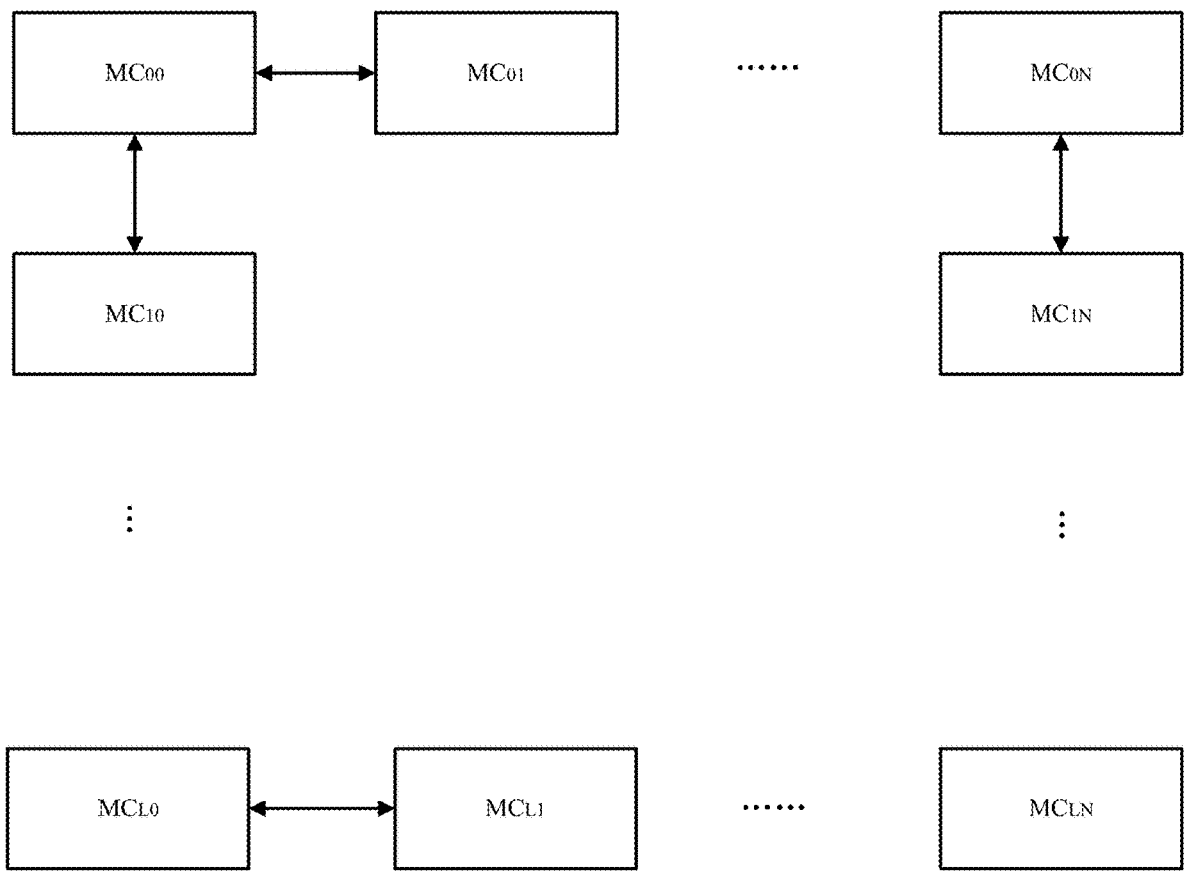
FIG. 1a is a schematic diagram of the structure of an acceleration unit according to an embodiment of the present disclosure.

FIG. 1a is a schematic diagram of the structure of an acceleration unit according to an embodiment of the present disclosure. An embodiment of the present disclosure provides an acceleration unit including M acceleration cards of this acceleration unit. Each acceleration card of this acceleration unit includes an internal connection port, and each acceleration card of this acceleration unit is connected to other acceleration cards of this acceleration unit through the internal connection port, where the M acceleration cards of this acceleration unit logically form an acceleration card matrix with a scale of L*N, and L and N are integers not less than 2.

As shown in FIG. 1a, an acceleration card matrix may be formed by a plurality of accelerator cards, and the acceleration cards are connected to each other, so that data or instructions may be transmitted and communicated. For example, acceleration cards MC00 to MC0N form a 0-th row of the acceleration card matrix, acceleration cards MC10 to MC1N form a first row of the acceleration card matrix, and so on, and acceleration cards MCL0 to MCLN form an L-th row of the acceleration card matrix.

It should be understood that, for the convenience of understanding the context, acceleration cards in a same acceleration unit are referred to as "acceleration cards of this acceleration unit", and acceleration cards in other acceleration units are referred to as "acceleration cards of other acceleration units". Such names are only for the convenience of description, and do not limit the technical solution of the present disclosure.

Each acceleration card may have a plurality of ports, and these ports may be connected with the acceleration cards of this acceleration unit, and may also be connected with the acceleration cards of other acceleration units. In the present disclosure, connection ports between the acceleration cards of this acceleration unit may be called internal connection ports, and connection ports between the acceleration cards of this acceleration unit and the acceleration cards of other acceleration units may be called external connection ports. It should be understood that the external connection ports and the internal connection ports are only for the convenience of description, and the same ports may be used, which will be described below.

It should be understood that M may be any integer, and M acceleration cards may be formed into a 1*M or M*1 matrix, or M matrices may be formed into other types of matrices. The acceleration units of the present disclosure do not limit the specific size and type of the matrix.

Further, the acceleration cards may be connected through a single or a plurality of communication paths, and for example, the acceleration cards of this acceleration unit may be connected through a single or a plurality of communication paths, and the acceleration cards of this acceleration unit and the acceleration cards of other acceleration units may be connected through a single or a plurality of communication paths, which will be described below.

It should also be understood that, in the context of the present disclosure, although a rectangular network is used to describe the positions of a plurality of acceleration cards, in fact, the formed matrix is not necessarily matrix-shaped in terms of physical spatial arrangement, but it may be in any position; for example, the plurality of acceleration cards may form a straight line or the plurality of acceleration cards may be arranged irregularly. The above matrix is only logical, as long as the connections between the acceleration cards form a matrix relationship.

According to an embodiment of the present disclosure, M may be 4, and therefore, 4 acceleration cards of this acceleration unit may logically form a 2*2 acceleration card matrix; M may be 9, and therefore, 9 acceleration cards of this acceleration unit may logically form a 3*3 acceleration card matrix; and M may be 16, and therefore, 16 acceleration cards of this acceleration unit may logically form a 4*4 acceleration card matrix. M may also be 6, and therefore, 6 acceleration cards of this acceleration unit may logically form a 2*3 or 3*2 acceleration card matrix; M may also be 8, and therefore, 8 acceleration cards of this acceleration unit may logically form a 2*4 or 4*2 acceleration card matrix.

According to an embodiment of the present disclosure, each acceleration card of this acceleration unit is connected with at least one other acceleration cards of this acceleration unit through two paths.

In the topology described in the present disclosure, two acceleration cards of this acceleration unit may be connected through a single communication path, or may be connected through a plurality of paths (for example, two paths), as long as the number of ports is sufficient. Connecting through a plurality of communication paths is beneficial to ensure the reliability of communication between the acceleration cards, which will be explained and described in more detail in the examples below.

According to an embodiment of the present disclosure, two pairs of acceleration cards of this acceleration unit at opposite corners of the acceleration card matrix are connected through two paths. For a matrix, it is preferable to connect two pairs of acceleration cards at the opposite corners of the matrix. For some topologies, the connection of acceleration cards at diagonal positions helps to form two complete communication loops, which will be explained and described in more detail in the examples below.

More specifically, according to an embodiment of the present disclosure, at least one of the acceleration card of this acceleration unit may include an external connection port. For example, each acceleration unit may include four acceleration cards of this acceleration unit, and each acceleration card of this acceleration unit may include six ports. Four ports of each acceleration card of this acceleration unit are internal connection ports for connecting with other three acceleration cards of this acceleration unit; the remaining two ports of at least one acceleration card of this acceleration unit are external connection ports for connecting with the acceleration cards of other acceleration units.

It should be understood that, among the six ports of the acceleration card of this acceleration unit, four ports may be used to connect to the acceleration card of this acceleration unit, and the remaining two ports may be used to connect to the acceleration cards of other acceleration units. These remaining ports may also be idle ports that are not connected to any external device or are directly or indirectly connected to other devices or ports.

For the purpose of illustration and simplification, the acceleration unit, the acceleration assembly, the acceleration device, and the electronic device are described below as each acceleration unit consisting of four acceleration cards. It should be understood that each acceleration unit may include more or less acceleration cards.

For the convenience of description, the acceleration unit may include four acceleration cards, i.e. a first acceleration card, a second acceleration card, a third acceleration card and a fourth acceleration card. Each acceleration card is provided with an internal connection port and an external connection port, and each acceleration card is connected with other three acceleration cards through the internal connection port.

Figure 1B:
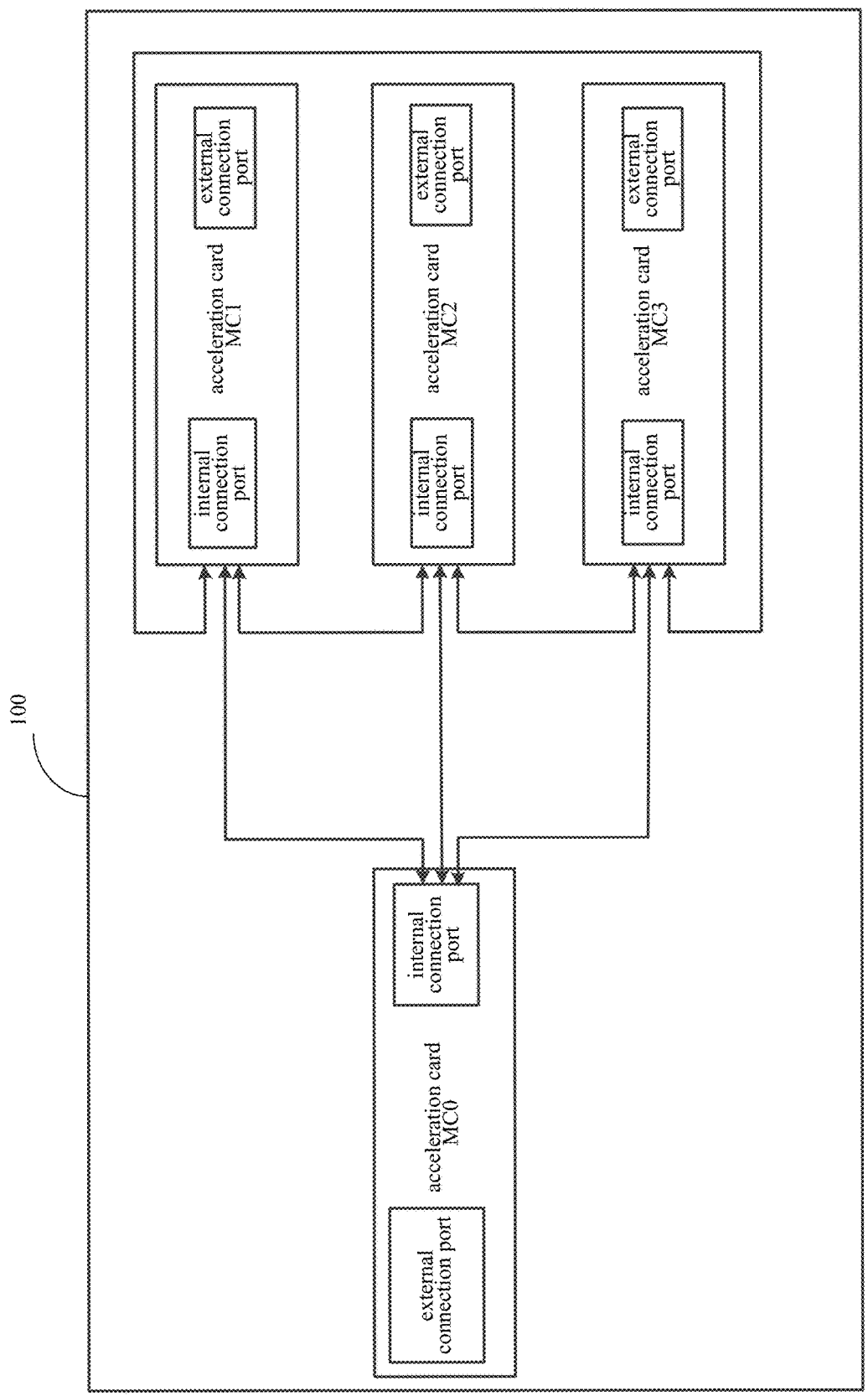
FIG. 1b, FIG. 2, FIG. 3, FIG. 4, and FIG. 5a-FIG. 5c are schematic diagrams of structures of acceleration units according to an embodiment of the present disclosure.

FIG. 1B is a schematic diagram of the structure of an acceleration unit according to an embodiment of the present disclosure. An acceleration unit 100 includes four acceleration cards, which are an acceleration card MC0, an acceleration card MC1, an acceleration card MC2, and an acceleration card MC3. For four acceleration cards, each acceleration card may include an external connection port and an internal connection port. An internal connection port of the acceleration card MC0 is connected to internal connection ports of the acceleration cards MC1, MC2, and MC3; an internal connection port of the acceleration card MC1 is connected to internal connection ports of the acceleration cards MC2 and MC3; and an internal connection port of the acceleration card MC2 is connected to an internal connection port of the acceleration card MC3. In other words, an internal connection port of each acceleration card is connected to internal connection ports of other three acceleration cards. The information exchange between the four acceleration cards may be realized through the interconnection of the internal connection ports of the four acceleration cards. The embodiment of the present disclosure utilizes the interconnection among the four acceleration cards in the acceleration unit, which may improve the computing power of the acceleration unit and realize the purpose of high-speed processing of massive data, and enable the path between each acceleration card and other acceleration cards to be the shortest and the communication latency to be the lowest.

As mentioned above, the number of acceleration cards in the present disclosure may not be limited to four, but may be other numbers. For example, in an embodiment, the number N of acceleration cards is equal to 3, and each acceleration card is provided with an internal connection port and an external connection port. Each acceleration card is connected to the other two acceleration cards through the internal connection port to realize the interconnection among the three acceleration cards. In another embodiment, the number N of acceleration cards is equal to 5, and each acceleration card is provided with an internal connection port and an external connection port. Each acceleration card is connected to the other four acceleration cards through the internal connection port to realize the interconnection among the five acceleration cards, so that the computing power of the acceleration unit is improved, and high-speed processing of massive data is realized. In another embodiment, the number N of acceleration cards is greater than 5, and each acceleration card is provided with an internal connection port and an external connection port. Each acceleration card is connected to all other acceleration cards through the internal connection port to realize the interconnection among the N acceleration cards, so that high-speed processing of massive data is realized.

Based on the acceleration unit 100 provided in FIG. 1B, further, each acceleration card may be connected to at least one other acceleration card through two paths. Specifically, there may be, for example, three connection methods: a first connection method is that each acceleration card may be connected to one of the other three acceleration cards through two paths; the second method is that each acceleration card may be connected to two of the other three acceleration cards through two paths; the third method is that each acceleration card may be connected to the other three acceleration cards through two paths, in which case it is not ruled out that each acceleration card has more ports. In order to facilitate understanding of the connection methods of the above two paths, the following will take the first connection method as an example and make an exemplary description in conjunction with FIG. 2.

Figure 2:
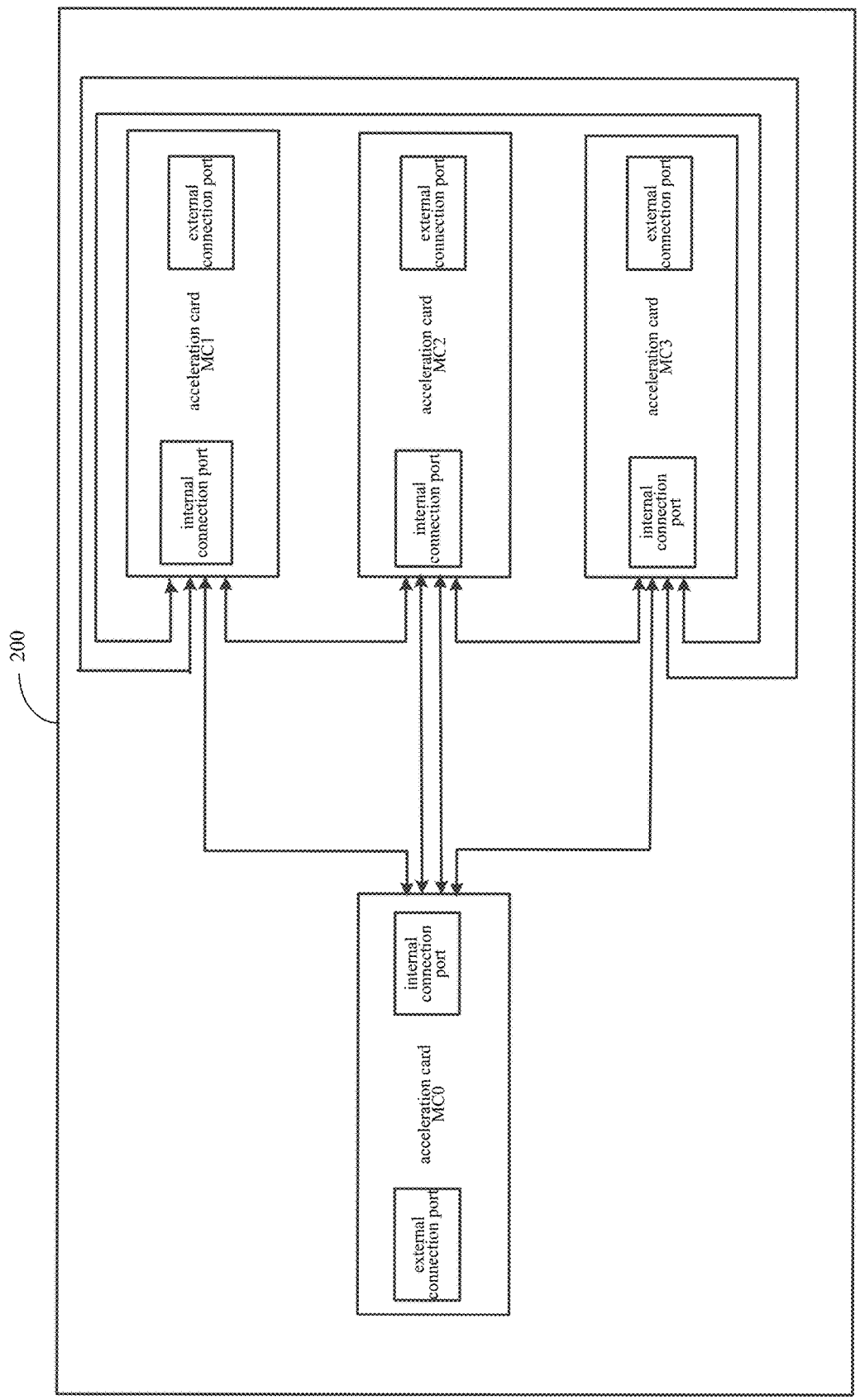

FIG. 2 is a schematic diagram of the structure of an acceleration unit according to another embodiment of the present disclosure. In an acceleration unit 200 shown in FIG. 2, each acceleration card may be connected with at least one other acceleration card through two paths. For example, the acceleration card MC0 and the acceleration card MC2 in the figure may be connected through two paths, and the acceleration card MC1 and the acceleration card MC3 may be connected through two paths. According to such a setup, there may be two links (or paths) for information interaction between two acceleration cards, so that when one of the links fails, there is another link to connect the two acceleration cards, which may effectively improve the security of the acceleration unit.

The connection method of the acceleration unit and a plurality of acceleration cards of this acceleration unit in the present disclosure has been exemplarily described above in conjunction with FIG. 1 and FIG. 2. It should be understood by those skilled in the art that the above description is exemplary rather than restrictive. For example, the arrangement of the acceleration cards in the acceleration unit may not be limited to the forms shown in FIG. 1 and FIG. 2. In an embodiment, four acceleration cards of the acceleration unit may be logically arranged as a quadrilateral, which will be described below in conjunction with FIG. 3.

Figure 3:
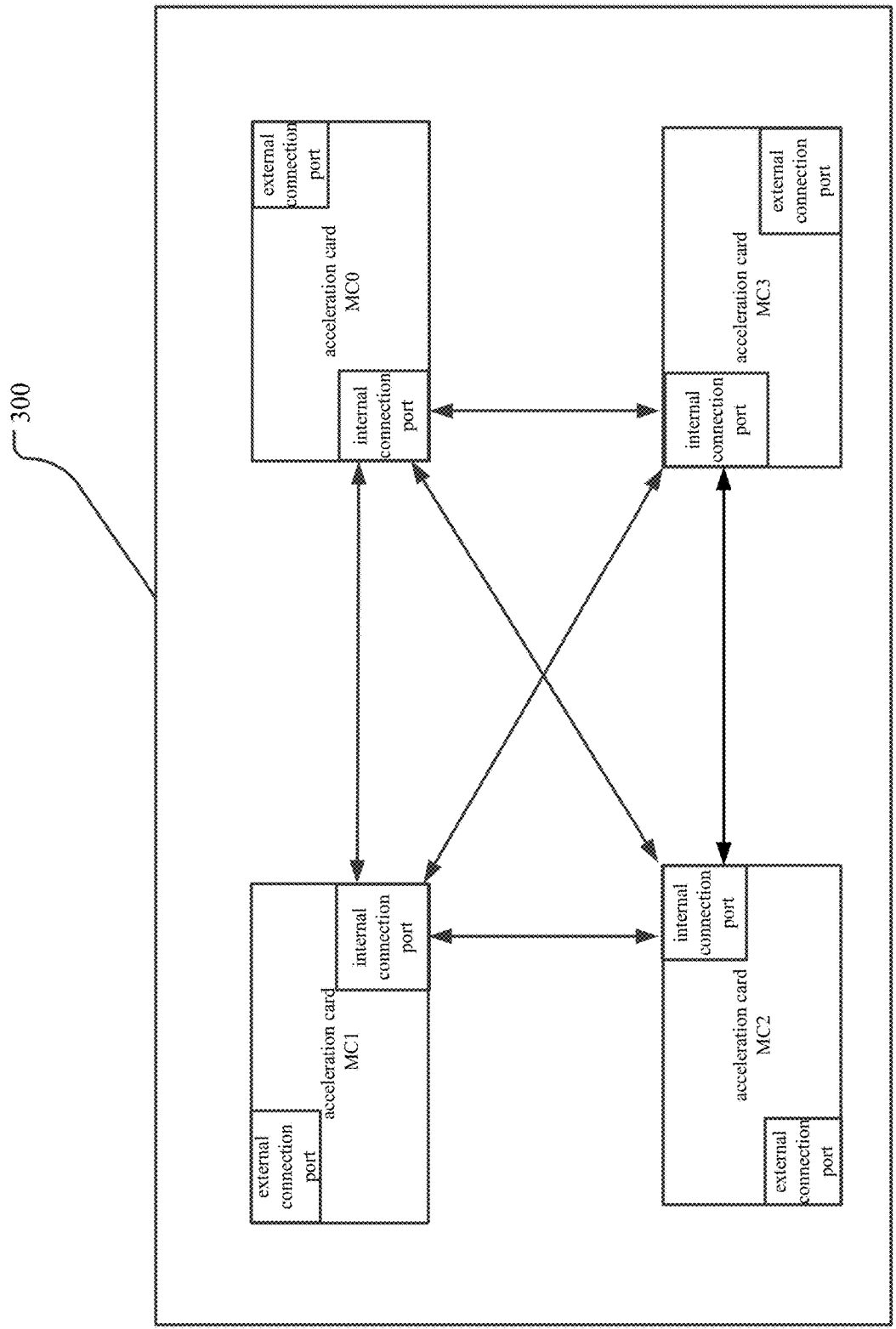

FIG. 3 is a schematic diagram of the structure of an acceleration unit according to another embodiment of the present disclosure. In an acceleration unit 300 shown in FIG. 3, the four acceleration cards MC0, MC1, MC2 and MC3 may be logically arranged as a quadrilateral, and the four acceleration cards may occupy four vertices of the quadrilateral. The lines between the four acceleration cards MC0, MC1, MC2 and MC3 show a quadrilateral shape, which makes the line arrangement clearer, so that it is easy to set the lines. It should be noted that the four acceleration cards shown in FIG. 3 are arranged in a rectangle or a 2*2 matrix, but this is a logical interconnection diagram and is drawn in the form of a rectangle only for the convenience of description. The specific quadrilateral may be freely set, such as a parallelogram, a trapezoid, a square, and the like. In the practical layout and wiring, the four acceleration cards may also be arbitrarily arranged. For example, in an actual whole machine, the four acceleration cards are arranged side by side in a straight line, and the sequence may be MC0, MC1, MC2, and MC3. It should also be understood that the logical quadrilateral described in this embodiment is an example, in fact, the arrangement shapes of the plurality of acceleration cards may be varied, and the quadrilateral is only one of them. For example, when the number of acceleration cards is five, the five acceleration cards may be logically arranged in a pentagon.

Figure 4:
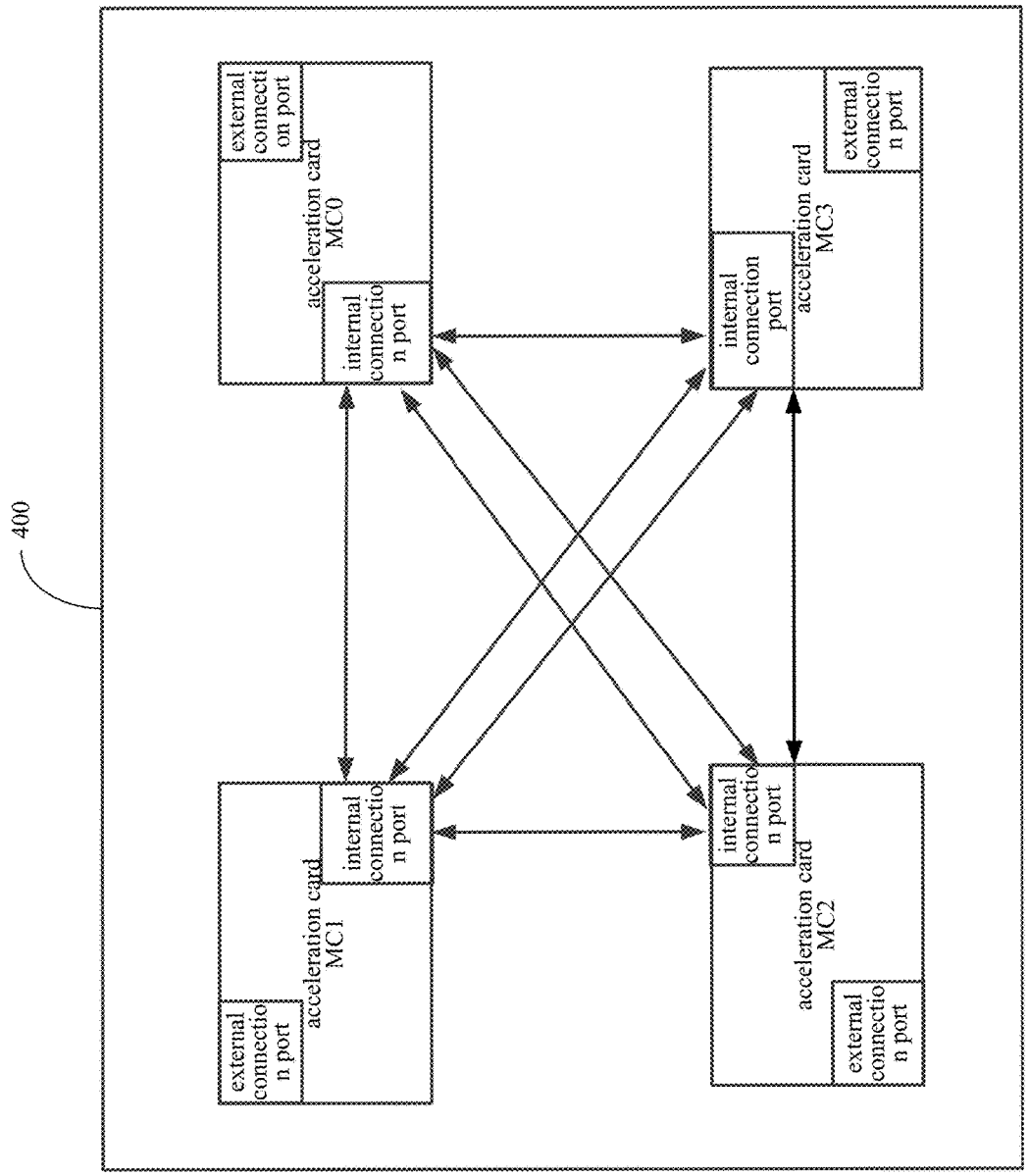

Based on the connection relationship of the acceleration unit 200 provided in FIG. 2, please further refer to FIG. 4. FIG. 4 is a schematic diagram of the structure of an acceleration unit according to another embodiment of the present disclosure. In an acceleration unit 400 shown in FIG. 4, the four acceleration cards MC0, MC1, MC2 and MC3 may be logically arranged as a quadrilateral, and the four acceleration cards may occupy four vertices of the quadrilateral, respectively. As further shown in the figure, the internal connection port of the acceleration card MC1 and the internal connection port of the acceleration card MC3 may be connected through two paths; and the internal connection port of the acceleration card MC0 and the internal connection port of the acceleration card MC2 may be connected through two paths. In this way, for the acceleration unit 400, not only the line setting is convenient, but also the safety is improved.

Figure 5A:
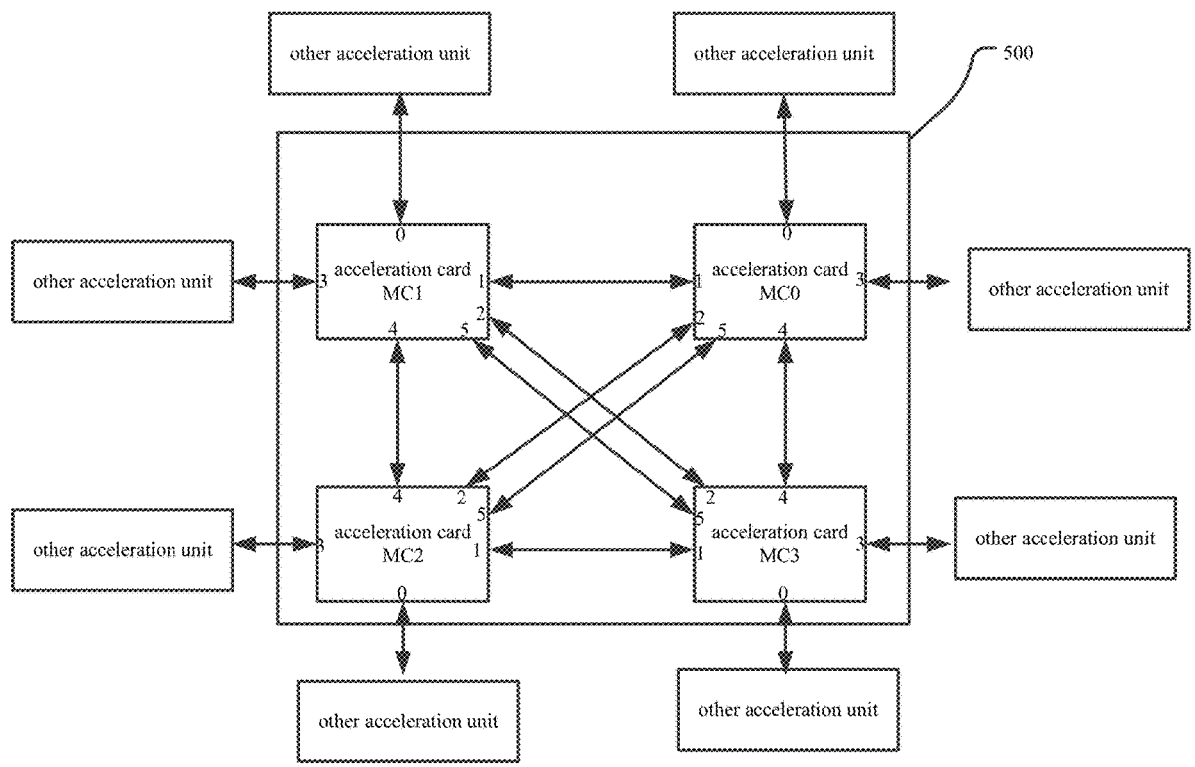

FIG. 5a is a schematic diagram of the structure of an acceleration unit according to an embodiment of the present disclosure. In the acceleration unit 500 shown in FIG. 5a, number marks on each acceleration card represent ports, and each acceleration card may include six ports, which are port 0, port 1, port 2, port 3, port 4, and port 5, where ports 1, 2, 4, and 5 are internal connection ports, and ports 0 and 3 are external connection ports. For the four acceleration cards MC0, MC1, MC2 and MC3, two external connection ports of each acceleration card may be connected to other acceleration units to complete the interconnection among a plurality of acceleration units. The four internal connection ports of each acceleration card may be used to interconnect with the other three acceleration cards in this acceleration unit.

As further shown in FIG. 5a, the four acceleration cards may be logically arranged in a quadrilateral. For example, the acceleration card MC0 and the acceleration card MC2 may be in diagonal positions, the port 2 of the MC0 is connected to the port 2 of the MC2, and the port 5 of the MC0 is connected to the port 5 of the MC2; in other words, there may be two links for communication between the acceleration card MC0 and the acceleration card MC2. The acceleration card MC1 and the acceleration card MC3 may be in diagonal positions, the port 2 of the MC1 is connected to the port 2 of the MC3, and the port 5 of the MC1 is connected to the port 5 of the MC3; in other words, there may be two links for communication between the acceleration card MC1 and the acceleration card MC3.

Figure 5B:
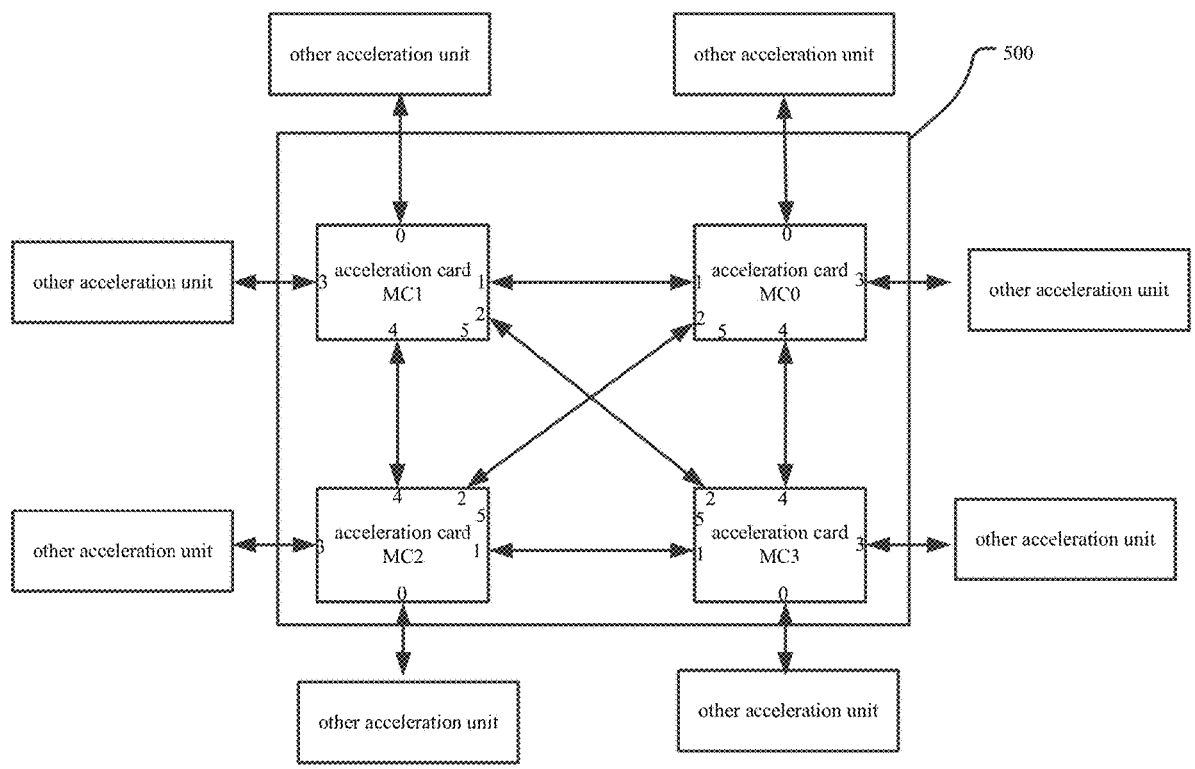
Figure 5C:
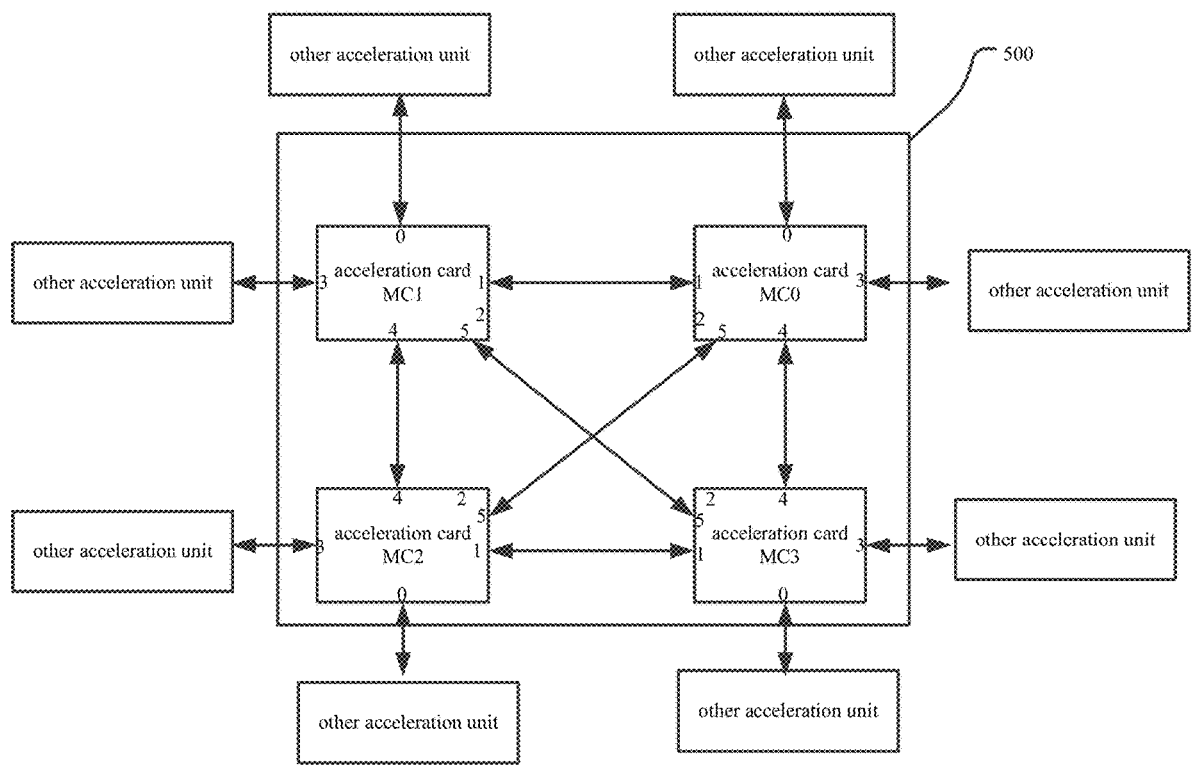

According to this setup, since each acceleration card has two external connection ports and four internal connection ports, and among the two pairs of acceleration cards in diagonal positions, the two acceleration cards of each pair of acceleration cards may be connected by two internal connection ports to form two links, the safety and stability of the acceleration unit are effectively improved. Moreover, the four acceleration cards are logically arranged as a quadrilateral, which makes the circuit layout of the entire acceleration unit reasonable and clear, and facilitates the wiring operation in each acceleration unit. It should be further noted that, among the interconnection lines between the four acceleration cards shown in FIG. 5b, a connection line between the port 1 of the acceleration card MC1 and the port 1 of the acceleration card MC0, a connection line between the port 2 of the acceleration card MC0 and the port 2 of the acceleration card MC2, a connection line between the port 1 of the acceleration card MC2 and the port 1 of the acceleration card MC3, and a connection line between the port 2 of the acceleration card MC3 and the port 2 of the acceleration card MC1 form a vertical figure-of-eight network, as shown in FIG. 5b. A connection line between the port 4 of the acceleration card MC1 and the port 4 of the acceleration card MC2, a connection line between the port 5 of the acceleration card MC2 and the port 5 of the acceleration card MC0, a connection line between the port 4 of the acceleration card MC0 and the port 4 of the acceleration card MC3, and a connection line between the port 5 of the acceleration card MC3 and the port 5 of the acceleration card MC1 form a horizontal figure-of-eight network, as shown in FIG. 5c. Such two fully-connected square networks may form a double-ring structure, which has functions of redundant backup and enhanced system reliability.

According to an embodiment of the present disclosure, the acceleration card disclosed in the present disclosure may be a Mezzanine Card (MC card for short), which may be a separate circuit board. The MC card may carry an ASIC chip and some necessary peripheral control circuits. The MC card may be connected with a base board via a gusset connector. The power and control signals on the base board may be transmitted to the MC card via the gusset connector. According to another embodiment of the present disclosure, the internal connection ports and/or external connection ports described in the present disclosure may be SerDes ports. For example, in an embodiment, each MC card may provide 6 bidirectional SerDes ports. Each SerDes port has 8 channels, and the data transmission rate of each SerDes port is 56 Gbps, so that the total bandwidth of each port may be as high as 400 Gbps, which may support massive data exchange between acceleration cards, and help the acceleration unit to process massive data at high speed.

The SerDes mentioned above is a compound word of English words Serializer and De-Serializer, and is called a serial deserializer. A SerDes interface may be used to build a high-performance processor cluster. The main function of Serdes is to convert multiple channels of low-speed parallel signals into serial signals at a sending end, transmit the serial signals through a transmission medium, and finally convert the high-speed serial signals into low-speed parallel signals at a receiving end, and therefore, Serdes is well suited to meet the demand for long distance and high speed transmission from end to end. In another embodiment, the external connection ports in the acceleration card may be connected to QSFP-DD (Quad Small Form Factor Pluggable-Double Density) interfaces of other acceleration units. The QSFP-DD interface is a kind of optical module interface commonly used in SerDes technology, and is used in conjunction with cables to interconnect with other external devices.

Further, according to another embodiment of the present disclosure, an acceleration unit may carry four acceleration cards inside, and the interconnection of the four acceleration cards may be completed adopting PCB (printed circuit board) wiring. With reasonable layout and wiring on a high-speed plate with low dielectric constant, the signal integrity may be ensured to the maximum extent, and then the communication bandwidth between the four acceleration cards converges to a theoretical value.

Inside the acceleration unit disclosed in the present disclosure, for the four acceleration cards, each acceleration card is connected to the other three acceleration cards through the internal connection ports of the acceleration card, and each acceleration card may communicate directly with the other three acceleration cards. Such a communication architecture is fully connected square network topology (fully connected quad), and the advantage of this fully connected network architecture is that the path between each acceleration card and other accelerator cards is the shortest, the total Hop count is the smallest, and the time delay is the lowest. The present disclosure uses Hop to describe the time delay of the system, and Hop denotes the count of Hops in communication, i.e., the frequency of communication. Hop specifically represents the shortest path from an initial node and back to this initial node after traversing all the nodes in the network. The fully connected square network formed by the interconnection of four acceleration cards has the shortest topology delay, and a double-ring structure formed by the interconnection of two acceleration cards in diagonal positions may improve the robustness of the system, and the service may run normally when a single acceleration card fails. When performing various arithmetic logic operations, each ring in the double-ring structure may perform a portion of the operations separately, thereby improving overall operation efficiency and maximizing the use of topological bandwidth.

A plurality of embodiments of acceleration units disclosed in the present disclosure are described above in connection with FIG. 1a-FIG. 5c. Based on the above-mentioned acceleration units, the present disclosure also discloses an acceleration assembly including a plurality of acceleration units, which will be described exemplarily below in connection with a plurality of embodiments of the acceleration assembly.

Figure 6:
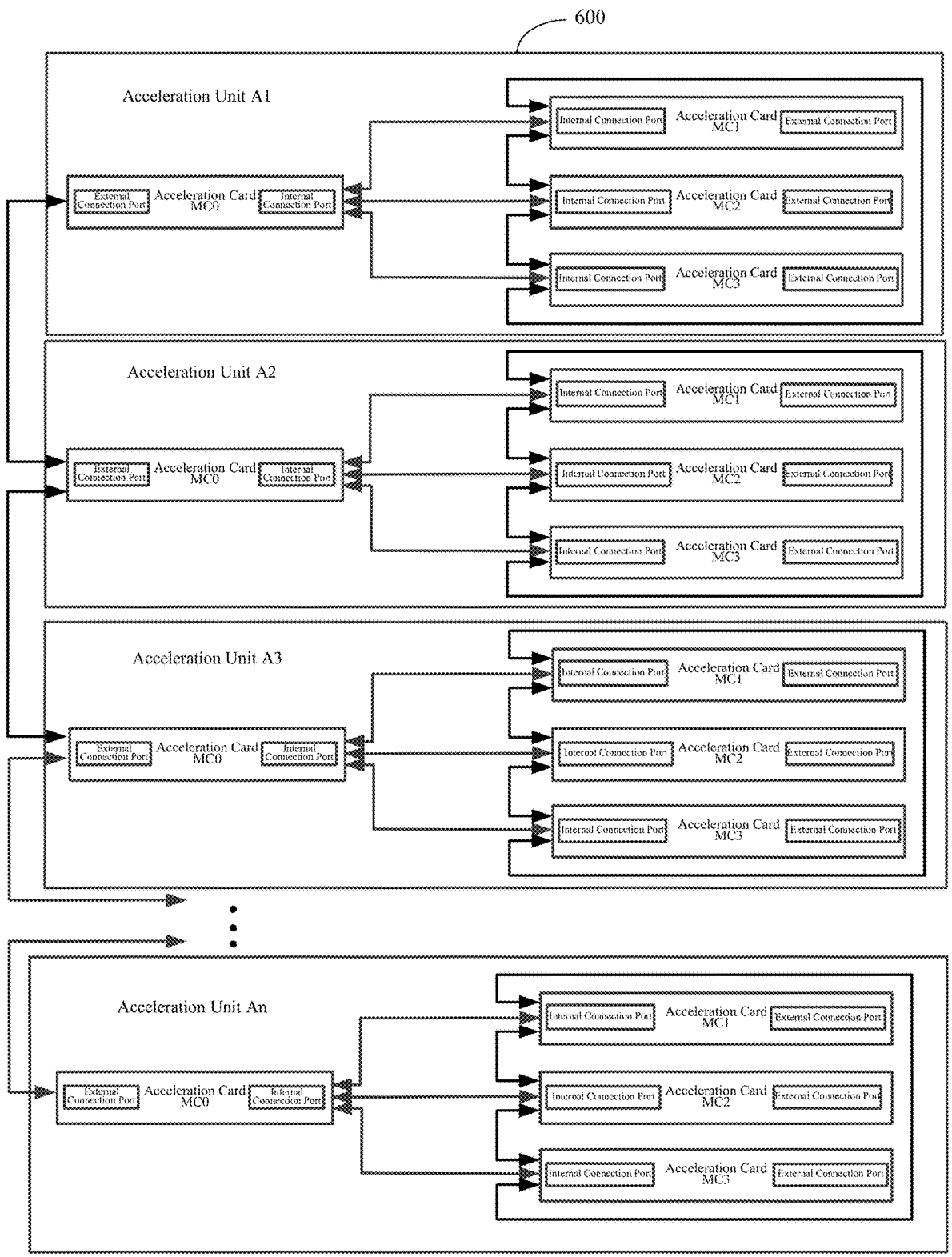
FIG. 6-FIG. 11 are a plurality of schematic diagrams of structures of acceleration assemblies according to an embodiment of the present disclosure.

FIG. 6 is a schematic diagrams of the structure of an acceleration assembly according to an embodiment of the present disclosure. As shown in FIG. 6, an acceleration assembly 600 may include n acceleration units, i.e., an acceleration unit A1, an acceleration unit A2, an acceleration unit A3, . . . , and acceleration unit An, where the acceleration unit A1 and the acceleration unit A2 are connected through an external connection port, and the acceleration unit A2 and the acceleration unit A3 are connected through the external connection port; in other words, each acceleration unit is connected to each other through the external connection port of the acceleration unit. In an embodiment, the external connection port of the acceleration card MC0 in the acceleration unit A1 may be connected to the external connection port of the acceleration card MC0 in the acceleration unit A2, and the external connection port of the acceleration card MC0 in the acceleration unit A2 may be connected to the external connection port of the acceleration card MC0 in the acceleration unit A3, and in other words, each acceleration unit is connected to each other through the external connection port of the acceleration card MC0.

It may be understood by those skilled in the art that the connection between the acceleration units in the present disclosure may not be limited to the connection of the external connection port of the acceleration card MC0, but may also include, for example, one or more of the connection of the external connection port of the acceleration card MC1, the connection of the external connection port of the acceleration card MC2, and the connection of the external connection port of the acceleration card MC3. In the present disclosure, connection methods of the acceleration unit A1 and the acceleration unit A2 may include one or more following connection methods: the external connection port of the MC0 in the A1 connecting to the external connection port of the MC0 in the A2, the external connection port of the MC1 in the A1 connecting to the external connection port of the MC1 in the A2, the external connection port of the MC2 in the A1 connecting to the external connection port of the MC2 in the A2, and the external connection port of the MC3 in the A1 connecting to the external connection port of the MC3 in the A2. Similarly, connection methods of the acceleration unit A2 and the acceleration unit A3 may include one or more following connection methods: the external connection port of the MC0 in the A2 connecting to the external connection port of the MC0 in the A3, the external connection port of the MC1 in the A2 connecting to the external connection port of the MC1 in the A3, the external connection port of the MC2 in the A2 connecting to the external connection port of the MC2 in the A3, and the external connection port of the MC3 in the A2 connecting to the external connection port of the MC3 in the A3. And so on, connection methods of the acceleration unit An−1 and the acceleration unit An may be obtained. It should be noted that the above description is exemplary; for example, the connection between different acceleration units may not be limited to the connection of acceleration cards corresponding to label numbers, but may be set to the connection of acceleration cards of the same label number as needed.

It should be noted that n acceleration units are shown in FIG. 6, and n is greater than 3. But the number of acceleration units may not be limited to greater than 3 shown in the figure, but may also be set as 2 or 3. The connection between two acceleration units is the same or similar to the connection between the acceleration units A1 and A2. The connection among three acceleration units is the same or similar to the connection among the acceleration units A1, A2 and A3, which will not be described herein.

In addition, structures of a plurality of acceleration units in the acceleration assembly may or may not be the same. The structures of the plurality of acceleration units shown in FIG. 6 may be the same for ease of presentation, but in practice, the structures of the plurality of acceleration units may be different. For example, the layout of a plurality of acceleration cards in some acceleration units may be a polygon, the layout of a plurality of acceleration cards in some acceleration units may be a straight line, a plurality of acceleration cards in some acceleration units may be connected through a link, a plurality of acceleration cards in some acceleration units may be connected through two links, some acceleration units include four acceleration cards, some acceleration units include three or five acceleration cards, and the like; in other words, the structure of each acceleration unit may be set individually, and structures of different acceleration units may be the same or different.

For the acceleration assembly disclosed in the present disclosure, not only the acceleration cards inside the acceleration units in the acceleration assembly may be interconnected, but also the acceleration cards of different acceleration units may be interconnected, so that a hybrid stereo network may be built. According to such a setup, while performing data processing, each acceleration card may also share data through interconnection between the acceleration units, which has a significant effect on improving data processing efficiency because the sharing of data allows direct access to data, reducing the data propagation path and time.

Figure 7:
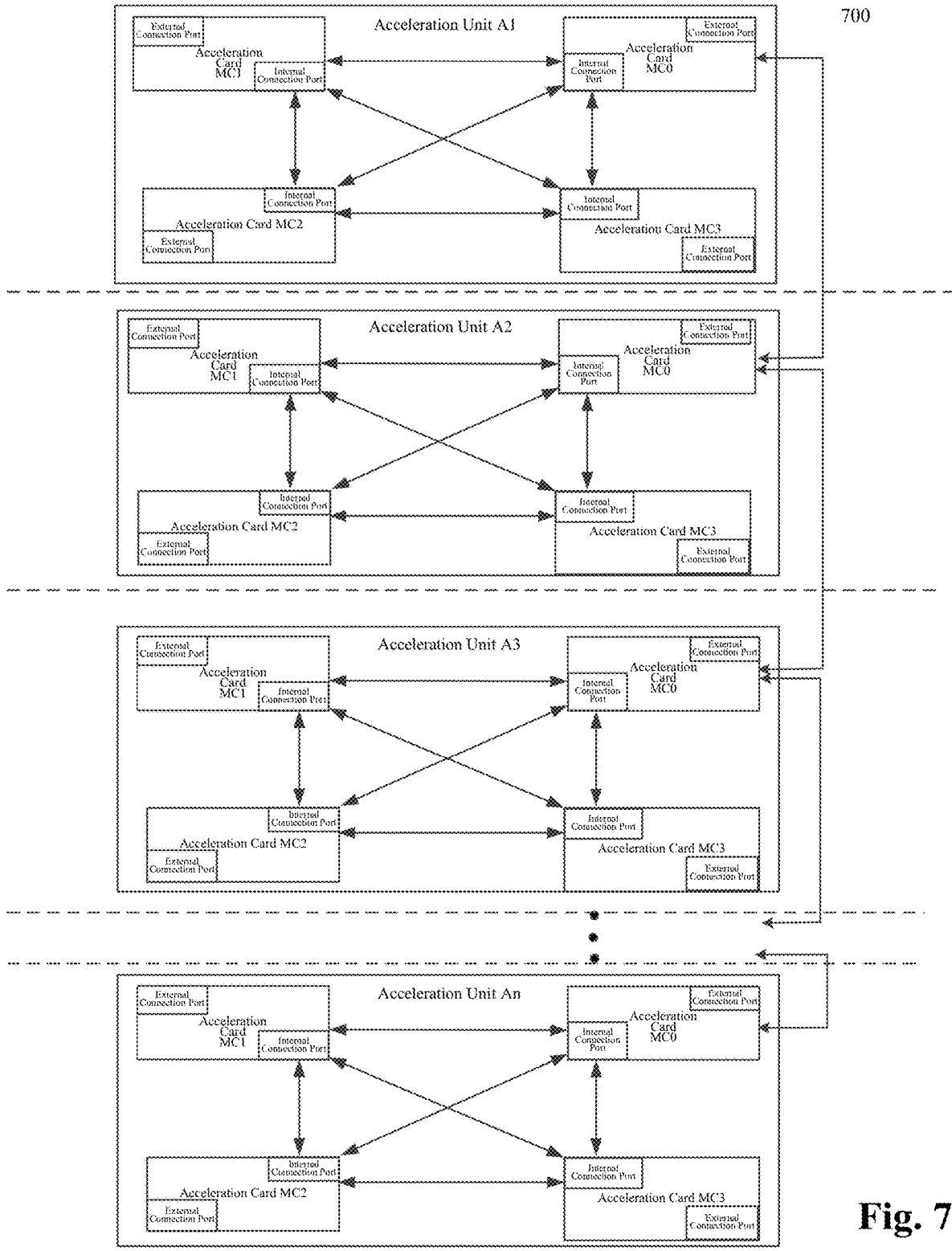

FIG. 7 is a schematic diagrams of the structure of an acceleration assembly according to another embodiment of the present disclosure. As shown in FIG. 7, an acceleration assembly 700 may include n aforementioned acceleration units, i.e., the acceleration unit A1, the acceleration unit A2, the acceleration unit A3, . . . , and the acceleration unit An. A plurality of acceleration units in the acceleration assembly 700 may be logically structured in a plurality of layers (shown in dashed lines in the figure), where each layer may include one acceleration unit, and acceleration cards in each acceleration unit are connected to acceleration cards of another acceleration unit through an external connection port. Such layer upon layer progressive configuration makes each acceleration card share data through a high-speed serial link while processing data at high speed, realizing infinite interconnection of acceleration cards, so as to meet the requirements of customizable computing power and realize flexible configuration of the hardware computing power of a processor cluster. As further illustrated in the figure, the acceleration units in each layer may include four acceleration cards. The acceleration units may be logically arranged as a quadrilateral, and the four acceleration cards may occupy four vertices of the quadrilateral, respectively.

It should be understood by those skilled in the art that the above described acceleration assembly in conjunction with FIG. 7 may be exemplary rather than restrictive. For example, the structures of the plurality of acceleration units may be the same or different. The number of layers of the acceleration assembly may be 2, 3, 4, or more, and the number of layers may be freely set according to needs. The number of connection paths between each two connected acceleration units may be 1, 2, 3 or, 4. For ease of understanding, the following will be described exemplarily in conjunction with FIG. 8-FIG. 12.

Figure 8:
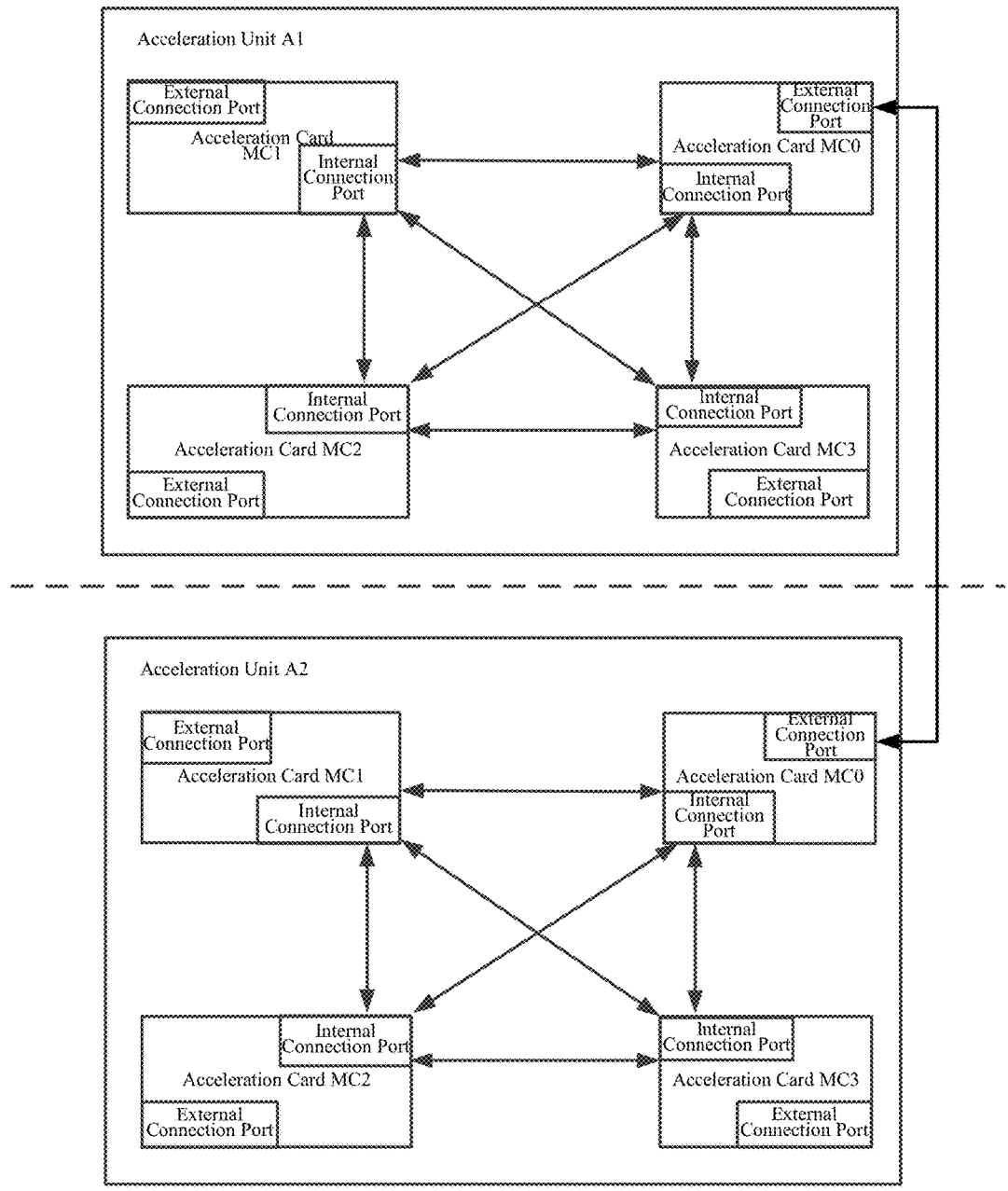

FIG. 8 is a schematic diagrams of the structure of an acceleration assembly according to another embodiment of the present disclosure. As shown in FIG. 8, the number of acceleration units in an acceleration assembly 701 may be two, and the two acceleration units are connected to each other through a path. Specifically, the two acceleration units are connected to each other through; for example, the external connection port of the acceleration card MC0 in the acceleration unit A1 and the external connection port of the acceleration card MC0 in the acceleration unit A2, which may realize the information interaction between the acceleration unit A1 and the acceleration unit A2.

Figure 9:
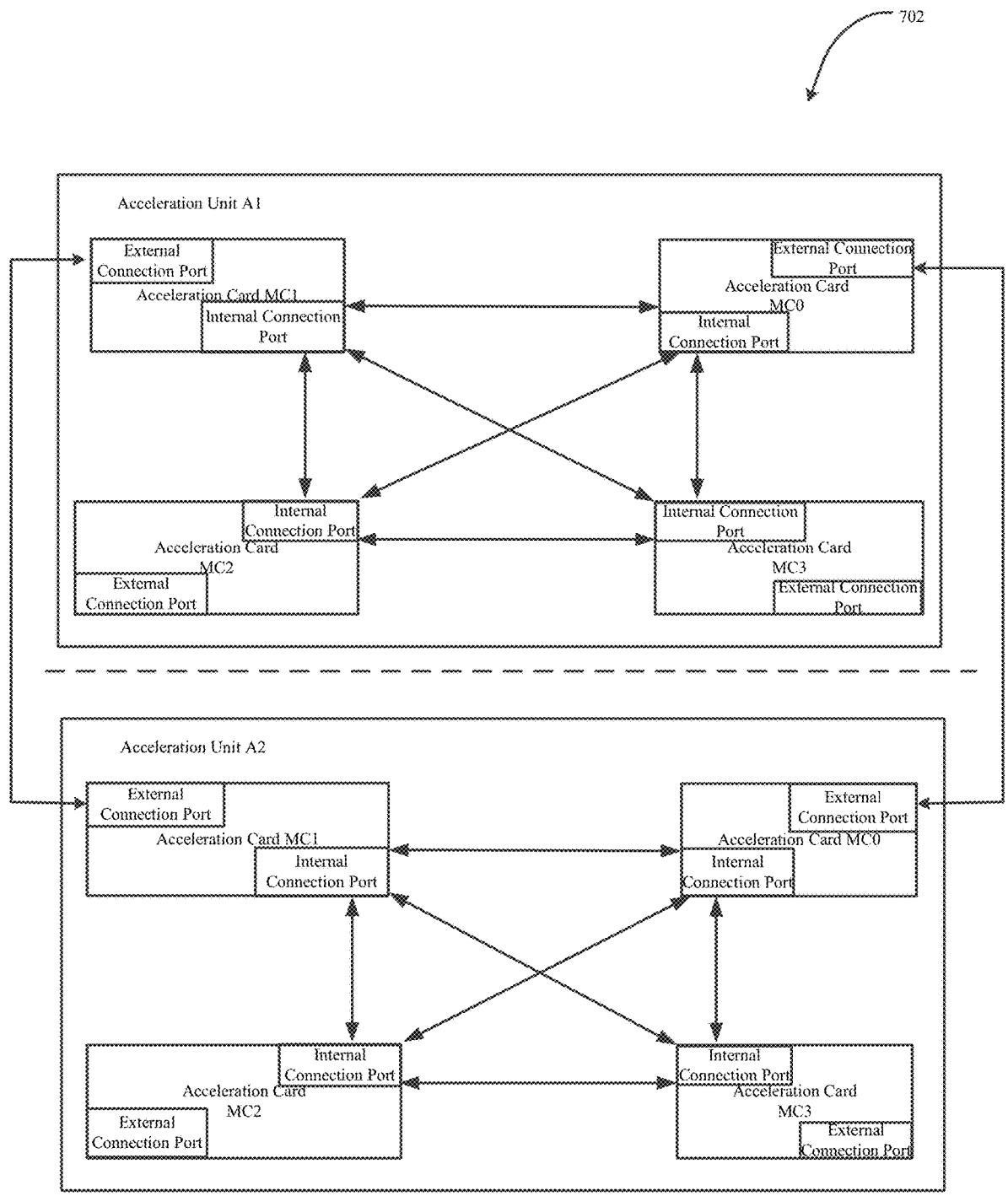

As shown in FIG. 9, the number of acceleration units in an acceleration assembly 702 may be two, and the two acceleration units are connected to each other through two paths. The external connection port of the acceleration card MC0 in the acceleration unit A1 is connected to the external connection port of the acceleration card MC0 in the acceleration unit A2, and the external connection port of the acceleration card MC1 in the acceleration unit A1 is connected to the external connection port of the acceleration card MC1 in the acceleration unit A2. In this way, when one of the paths fails, there is another path to support communication between the acceleration units, which may further improve the security of the acceleration assembly.

Figure 10:
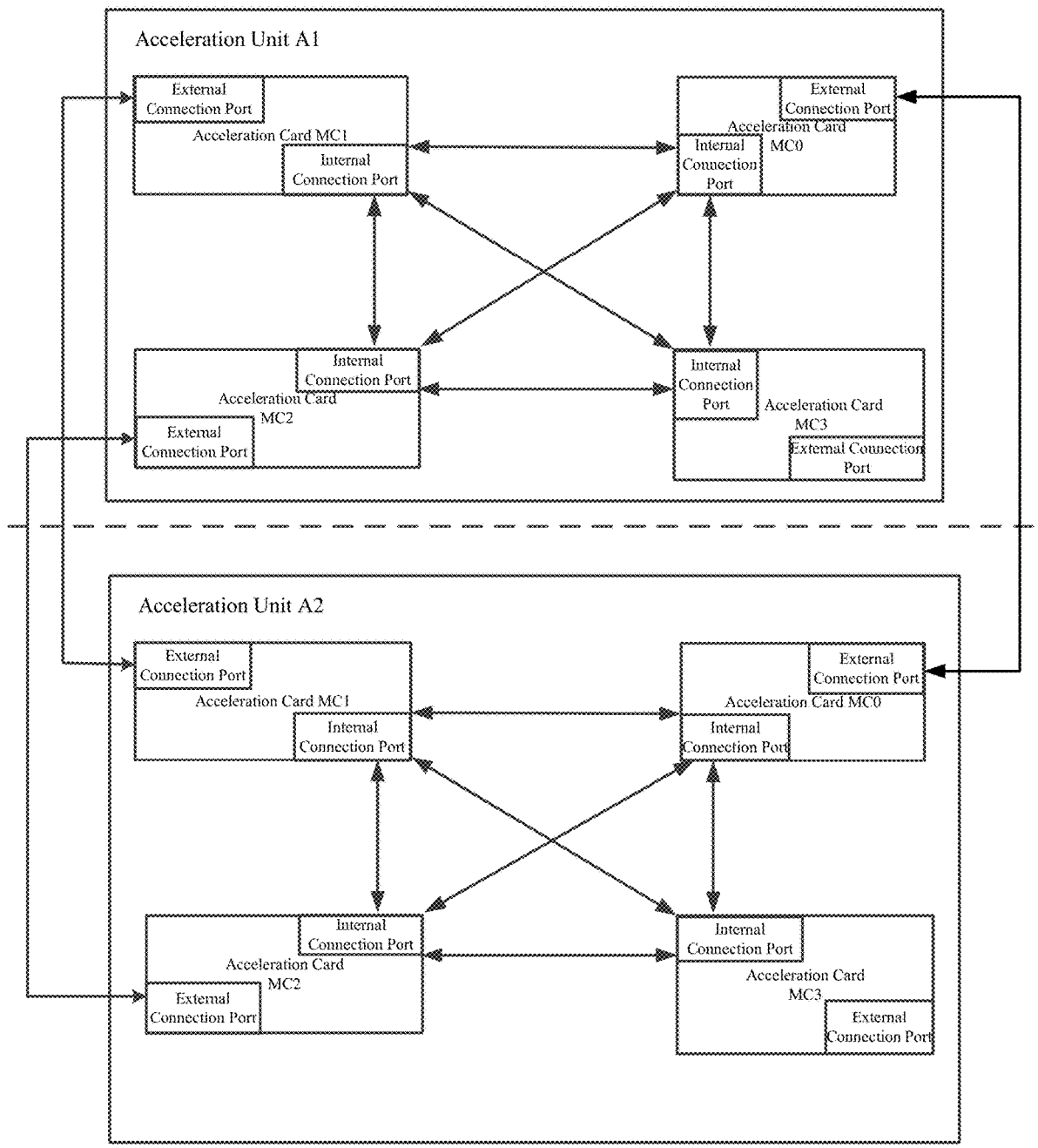

Referring to FIG. 10 below, FIG. 10 is a schematic diagrams of the structure of an acceleration assembly according to another embodiment of the present disclosure. As shown in FIG. 10, the number of acceleration units in an acceleration assembly 703 may be two, and the two acceleration units are connected by three paths. The external connection port of the acceleration card MC0 in the acceleration unit A1 may be connected to the external connection port of the acceleration card MC0 in the acceleration unit A2, the external connection port of the acceleration card MC1 in the acceleration unit A1 may be connected to the external connection port of the acceleration card MC1 in the acceleration unit A2, and the external connection port of the acceleration card MC2 in the acceleration unit A1 may be connected to the external connection port of the acceleration card MC2 in the acceleration unit A2. In this way, even when two of the paths fail, there is another path to support communication between the acceleration units, which may further improve the security of the acceleration assembly.

Figure 11:
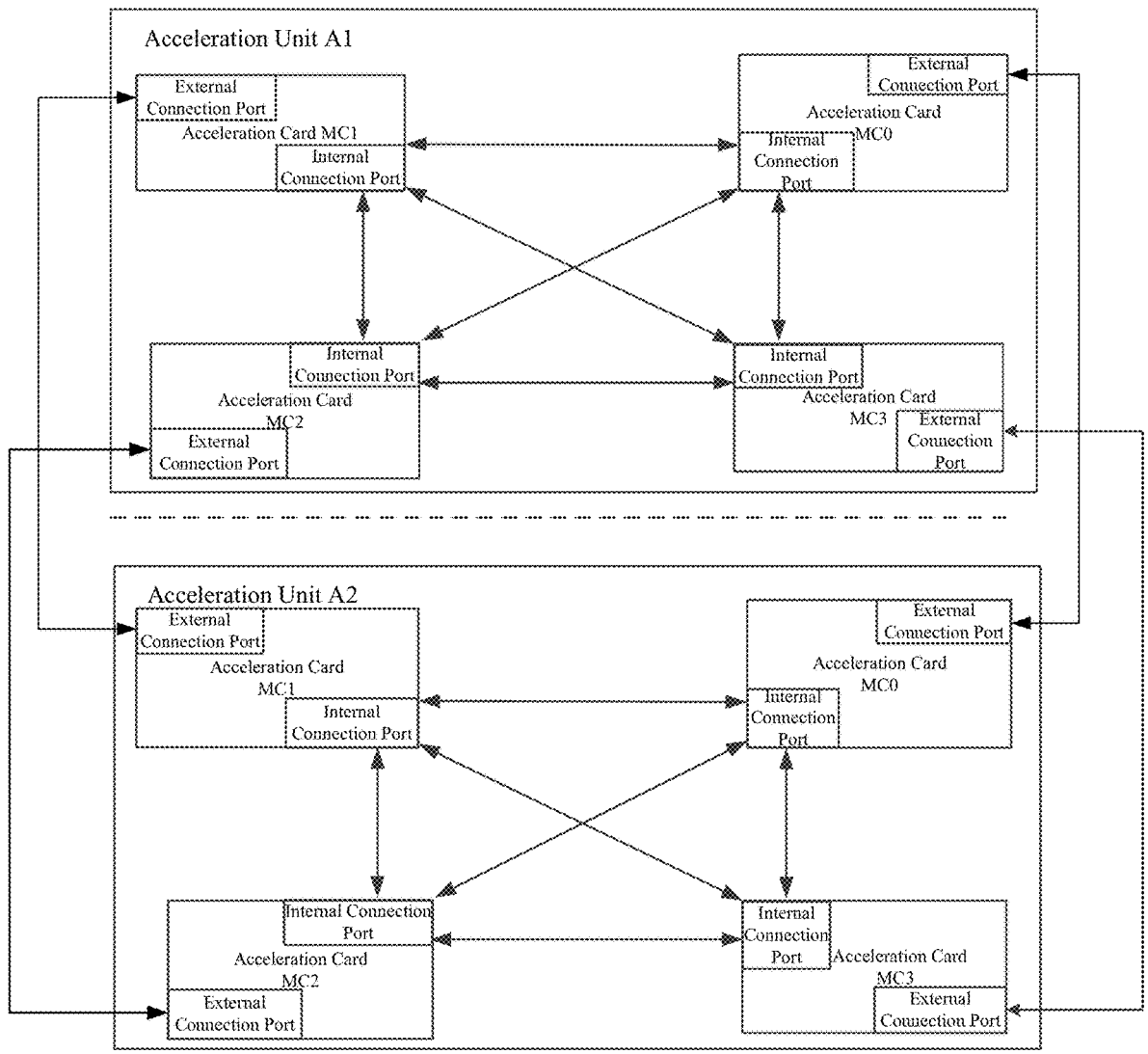

Referring to FIG. 11 below, FIG. 11 is a schematic diagrams of the structure of an acceleration assembly according to another embodiment of the present disclosure. As shown in FIG. 11, the number of acceleration units in an acceleration assembly 704 may be two, and the two acceleration units are connected to each other through four paths. For example, the external connection port of the acceleration card MC0 in the acceleration unit A1 may be connected to the external connection port of the acceleration card MC0 in the acceleration unit A2, the external connection port of the acceleration card MC1 in the acceleration unit A1 may be connected to the external connection port of the acceleration card MC1 in the acceleration unit A2, the external connection port of the acceleration card MC2 in the acceleration unit A1 may be connected to the external connection port of the acceleration card MC2 in the acceleration unit A2, and the external connection port of the acceleration card MC3 in the acceleration unit A1 may be connected to the external connection port of the acceleration card MC3 in the acceleration unit A2. In this way, even when three of the paths fail, there is another path to support communication between the acceleration units, which may further improve the security of the acceleration assembly.

Figure 12A:
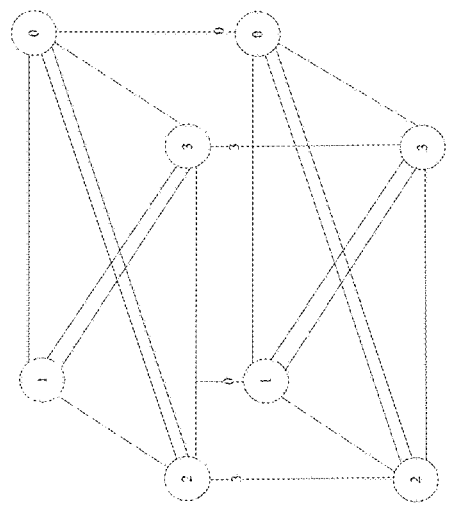
FIG. 12a-FIG. 12c are schematic diagrams of acceleration assemblies represented as network topologies.
Figure 12A:
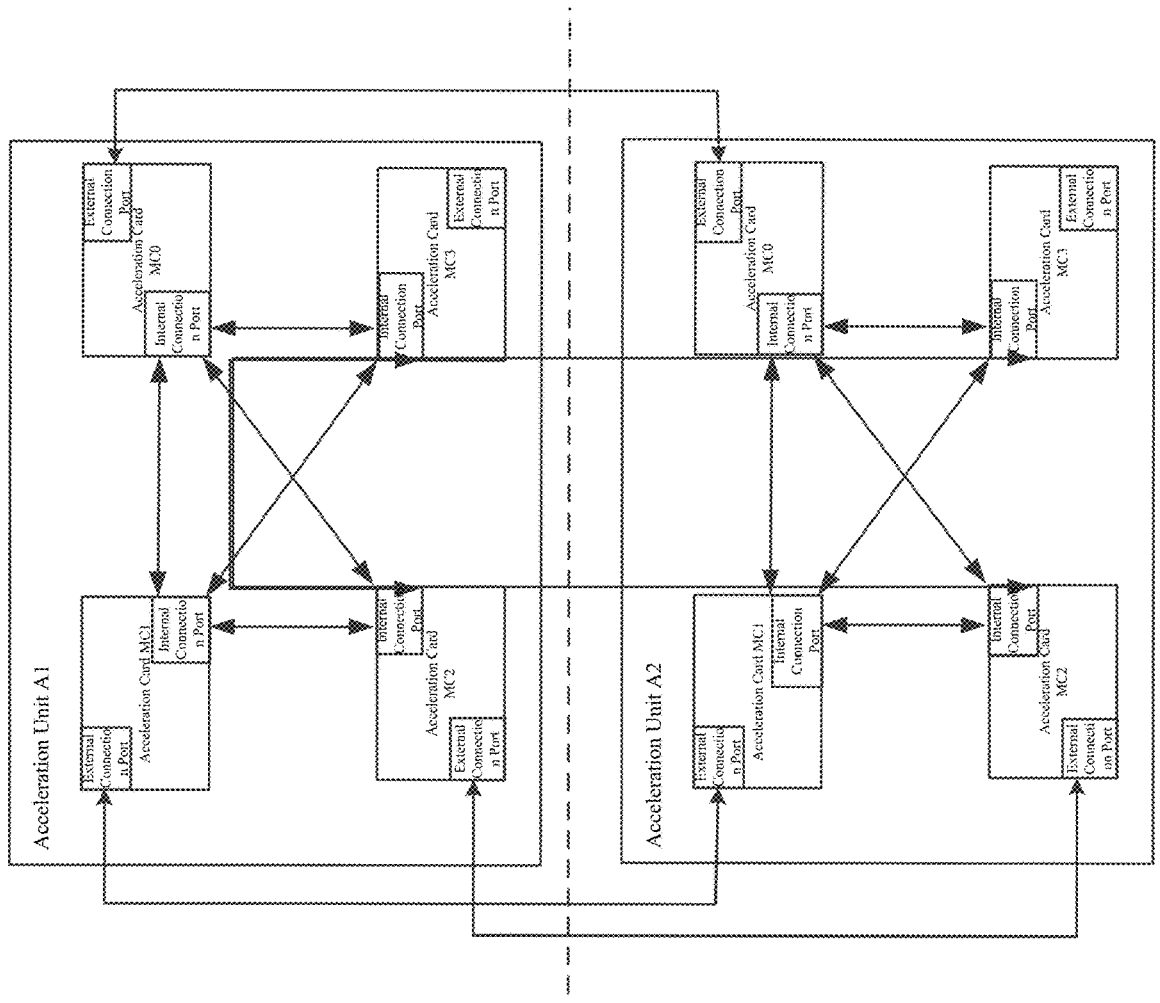

FIG. 12a is a schematic diagram of acceleration assemblies represented as a network topology. As shown in FIG. 12a, an acceleration assembly 705 may include two acceleration units, and each acceleration unit may include four acceleration cards. In each acceleration unit, there may be two links between the acceleration card MC1 and the acceleration card MC3, and there may be two links between the acceleration card MC0 and the acceleration card MC2. The acceleration assembly 705 on the left of FIG. 12a may be formed into the three-dimensional representation shown on the right. Circles in the right of FIG. 12a all represent acceleration cards, and the lines all represent link connections. The number 0 in the circles represents the acceleration card MC0, the number 1 represents the acceleration card MC1, the number 2 represents the acceleration card MC2, and the number 3 represents the acceleration card MC3. The right of FIG. 12a still illustrates the acceleration assembly 705, but is another representation, and in other words, it illustrates the network topology. Numbers embedded in vertical lines in the right of FIG. 12 represent connected port numbers. For example, in two acceleration units, MC0s are connected by a port 0, MC1s are connected by a port 0, MC2s are connected by a port 3, and MC3s are connected by a port 3.

For the right of FIG. 12a, an acceleration unit is considered as a node, and two nodes have 8 acceleration cards, and in other words, two nodes constitute so-called eight-card interconnection. The interconnection relationship of one machine and four cards inside each node is certain. When two nodes are interconnected, an MC0 and an MC1 of an upper-layer node (the acceleration unit A1) are connected to an MC0 and an MC1 of a lower-layer node (the acceleration unit A2) through the port 0, respectively; an MC2 and an MC3 of the upper-layer node are connected to an MC2 and an MC3 of the lower-layer node through the port 3, respectively. This node topology is called Hybrid Cube Mesh, and in other words, the acceleration assembly 705 is a Hybrid Cube Mesh.

Figure 12B:
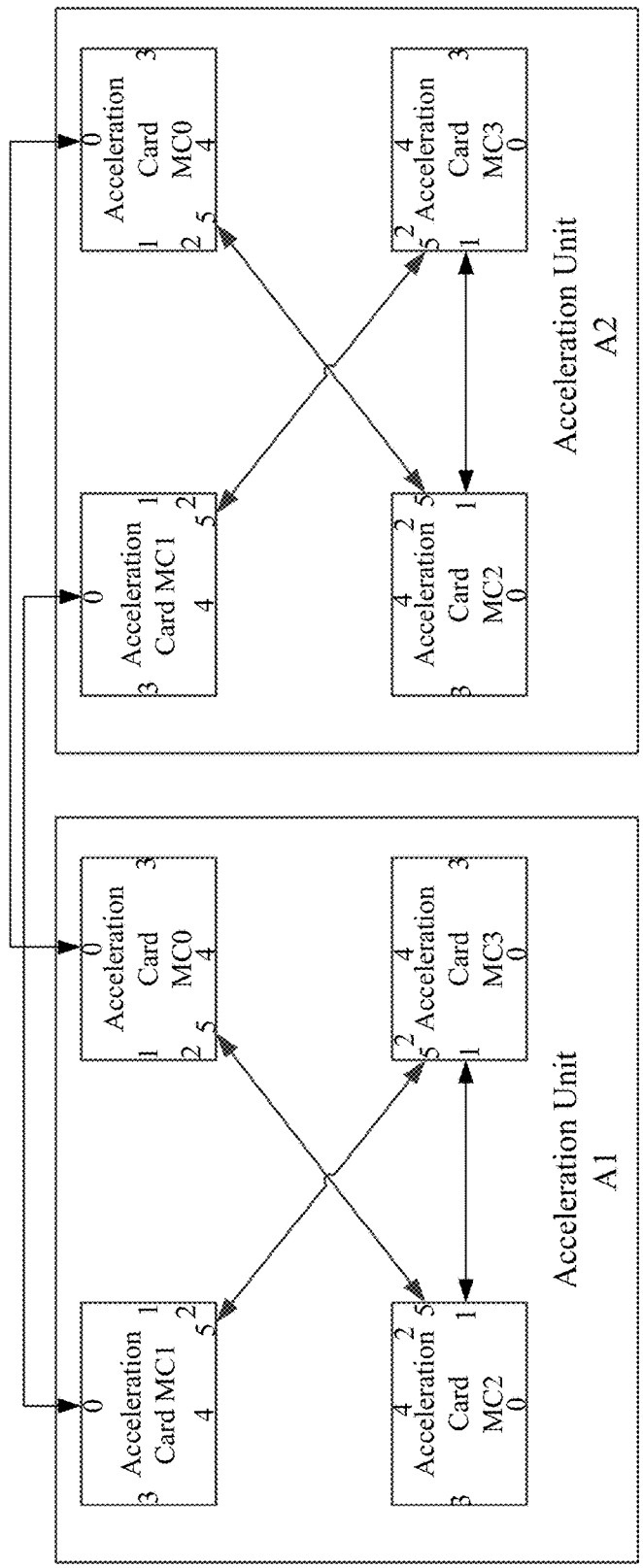
Figure 12C:
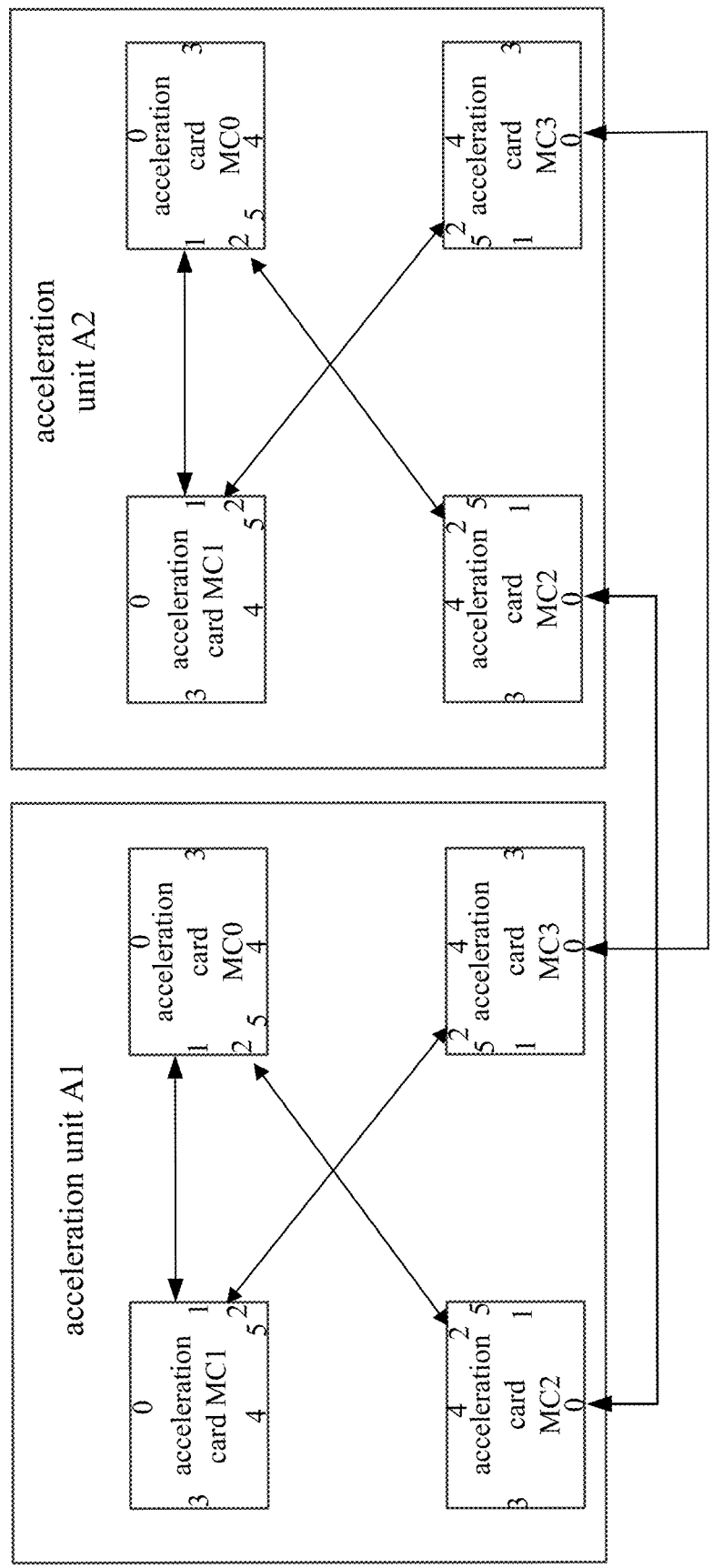

Two independent rings may be formed in the topology with 8 cards shown in FIG. 12a. As shown in FIG. 12b and FIG. 12c, this structure may maximize the use of topology bandwidth for performing a reduction operation.

In FIG. 12b, in the acceleration unit A1, the acceleration cards MC1 and MC3 are connected through their respective internal connection ports 5, the acceleration cards MC0 and MC2 are connected through their respective internal connection ports 5, and the acceleration cards MC2 and MC3 are connected through their respective internal connection ports 1; the acceleration card MC1 in the acceleration unit A1 and the acceleration card MC1 in the acceleration unit A2 are connected through their respective external connection ports 0, and the acceleration card MC0 in the acceleration unit A1 and the acceleration card MC0 in the acceleration unit A2 are connected through their respective external connection ports 0. Thus, an independent ring is formed in the 8 cards in FIG. 12.

In FIG. 12c, in the acceleration unit A1, the acceleration cards MC1 and MC3 are connected through their respective internal connection ports 2, the acceleration cards MC0 and MC2 are connected through their respective internal connection ports 2, and the acceleration cards MC0 and MC1 are connected through their respective internal connection ports 1; the acceleration card MC2 in the acceleration unit A1 and the acceleration card MC2 in the acceleration unit A2 are connected through their respective external connection ports 3, and the acceleration card MC3 in the acceleration unit A1 and the acceleration card MC3 in the acceleration unit A2 are connected through their respective external connection ports 3. Thus, another independent ring is formed in the 8 cards in FIG. 12.

The above only shows two exemplary connection methods, but in the practice, four connection paths between two acceleration units are actually equivalent, so that any one to three of these four paths may be used to connect the two acceleration units, and a ring connection may be formed with the acceleration cards in each acceleration unit, which will not be repeated herein.

Figure 13:
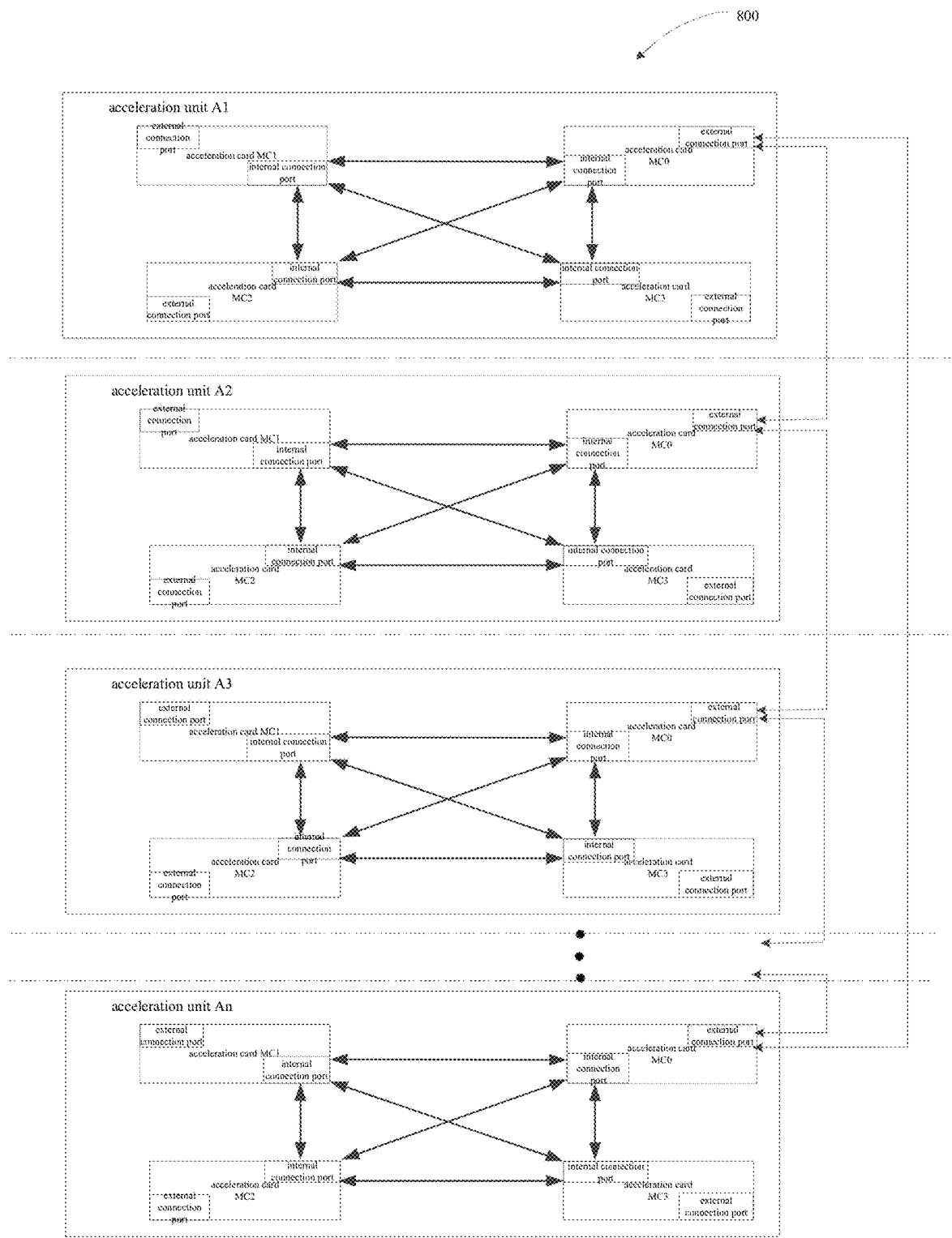
FIG. 13 is a schematic diagram of an acceleration device including a plurality of acceleration units according to an embodiment of the present disclosure.

FIG. 13 is a schematic diagram of an acceleration device according to another embodiment of the present disclosure. As shown in FIG. 13, an acceleration device 800 may include n afore-mentioned acceleration units, i.e., the acceleration unit A1, the acceleration unit A2, the acceleration unit A3, . . . , and the acceleration unit An. A plurality of acceleration units in the acceleration device 800 may be logically structured in a plurality of layers (shown in dashed lines in the figure), where the plurality of layers may include an odd or even number of layers. Each layer may include one acceleration unit, and acceleration cards in each acceleration unit are connected to acceleration cards in the other acceleration unit through external connection ports, where the acceleration unit A1 and acceleration unit A2 are connected through the external connection port, the acceleration unit A2 and the acceleration unit A3 are connected through the external connection port, and so on, and the acceleration unit An−1 and acceleration unit An are connected through the external connection port. The last acceleration unit may be connected to the first acceleration unit, so that the plurality of acceleration units are connected end to end to form a ring structure. For example, the external connection port of the acceleration card MC0 of the acceleration unit An in the figure is connected to the external connection port of the acceleration card MC0 of the acceleration unit A1. Such layer upon layer progressive configuration makes each acceleration card share data through a high-speed serial link while processing data at high speed, realizing infinite interconnection of acceleration cards, so as to meet the requirements of customizable computing power and realize flexible configuration of the hardware computing power of a processor cluster.

It should be noted that the connection of acceleration units in the acceleration device disclosed in the present disclosure may have a variety of situations, which have been described above in detail. For details, please refer to the description of the connection of acceleration units in FIG. 6, which will not be repeated herein. In addition, connection methods of a last acceleration unit and a first acceleration unit may include one or more following connection methods: the external connection port of the MC0 in the acceleration unit A1 connecting to the external connection port of the MC0 in the An, the external connection port of the MC1 in the A1 connecting to the external connection port of the MC1 in the An, the external connection port of the MC2 in the A1 connecting to the external connection port of the MC2 in the An, and the external connection port of the MC3 in the A1 connecting to the external connection port of the MC3 in the An. For ease of understanding, the following will be described exemplarily in conjunction with FIG. 14 and FIG. 15. In the following description, it is understood by those skilled in the art that the acceleration devices shown in FIG. 14 and FIG. 15 are a variety of specific forms of representation of the acceleration device 800 shown in FIG. 13, and therefore the relevant description of the acceleration device 800 in FIG. 13 may also be applied to the acceleration devices in FIG. 14 and FIG. 15.

Figure 14:
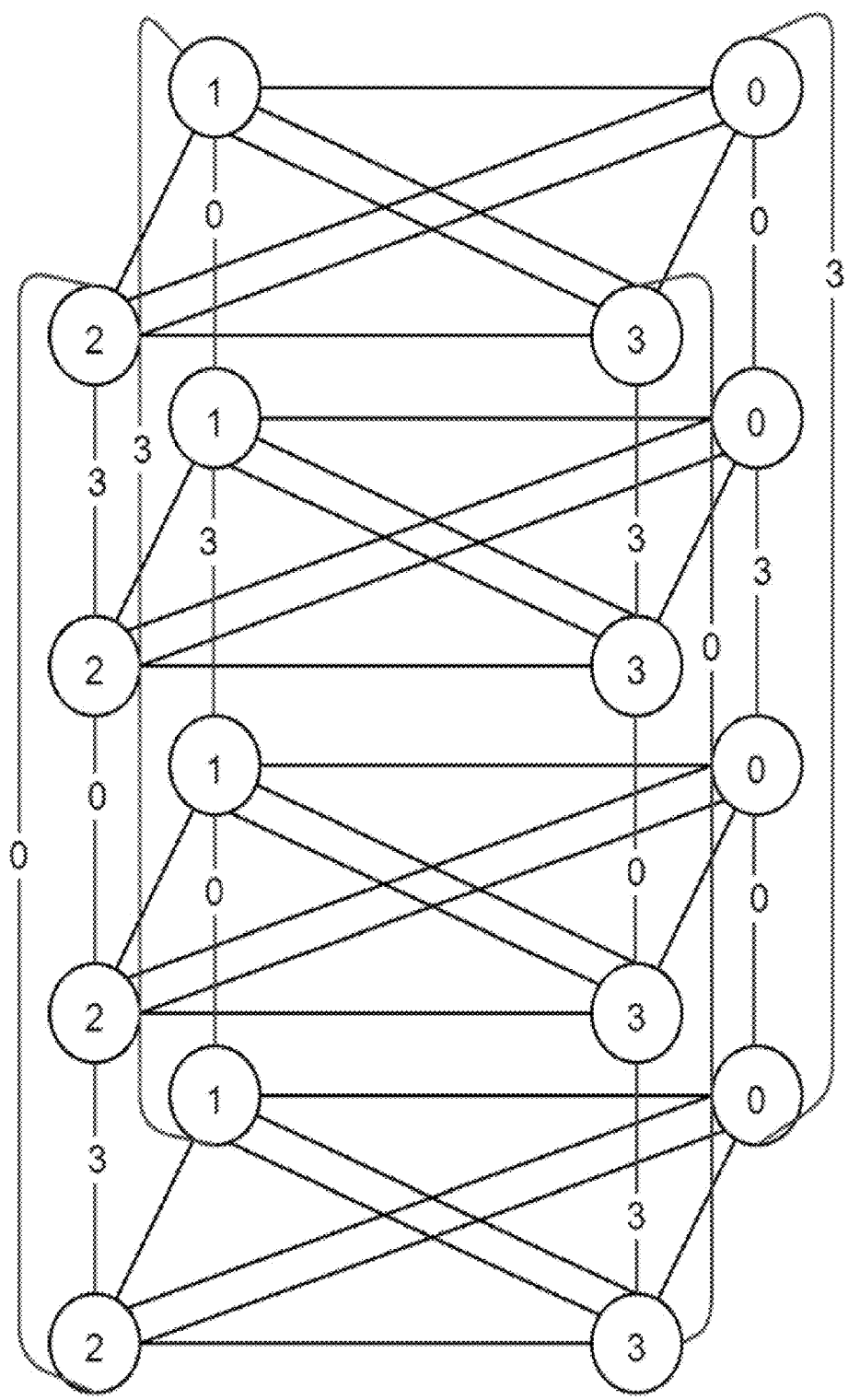
FIG. 14 is a schematic diagram of a network topology corresponding to an acceleration device according to an embodiment of the present disclosure.

Referring to the FIG. 14, FIG. 14 is a schematic diagram of a network topology corresponding to the acceleration device according to an embodiment of the present disclosure. The acceleration device 801 shown in FIG. 14 may consist of four acceleration units, where circles all represent acceleration cards, and lines all represent link connections. The number 0 in the circles represents the acceleration card MC0, the number 1 represents the acceleration card MC1, the number 2 represents the acceleration card MC2, the number 3 represents the acceleration card MC3, and numbers embedded in vertical lines represent connected port numbers. The last acceleration unit is connected to the first acceleration unit, with a total Hop count of 5. Each acceleration unit is a node, through the interconnection between nodes, the interconnection of four nodes and 16 cards may be realized. Four acceleration units form a small cluster, and the four acceleration units are interconnected, and in this way, a super pod is formed. This topology is the main form of the super pod, and adopts the high-speed SerDes port. The total Hop count is 5, and the time delay is the lowest. The super pod has good manageability and robustness.

Figure 15:
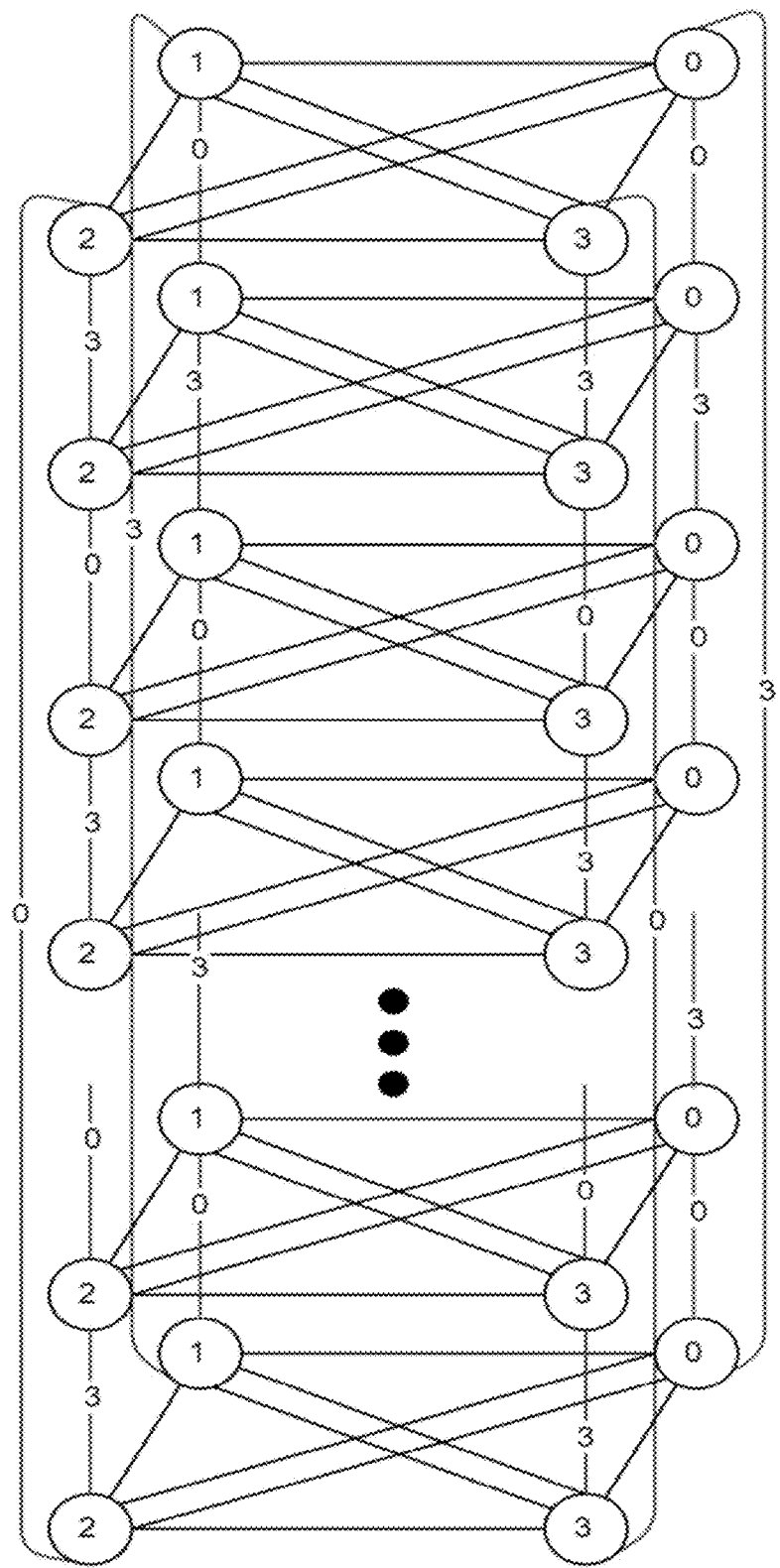
FIG. 15 is a schematic diagram of a network topology corresponding to the acceleration device according to another embodiment of the present disclosure.

Referring to the FIG. 15, FIG. 15 is a schematic diagram of a network topology corresponding to the acceleration device according to another embodiment of the present disclosure. The difference between FIG. 15 and FIG. 14 is that an acceleration unit 802 shown in FIG. 15 has more acceleration units. It may be seen from the figure that a last acceleration unit is connected to a first acceleration unit in the acceleration unit 802. According to the acceleration device set in this way, the total Hop count is the number of nodes plus one, and in other words, the total Hop count is the number of acceleration units plus one.

The acceleration device including a plurality of acceleration units has been described above with reference to FIG. 13-FIG. 15. According to the technical solution of the present disclosure, an acceleration device including a plurality of acceleration assemblies described above is provided, which will be described in detail below in conjunction with a plurality of embodiments.

Figure 16:
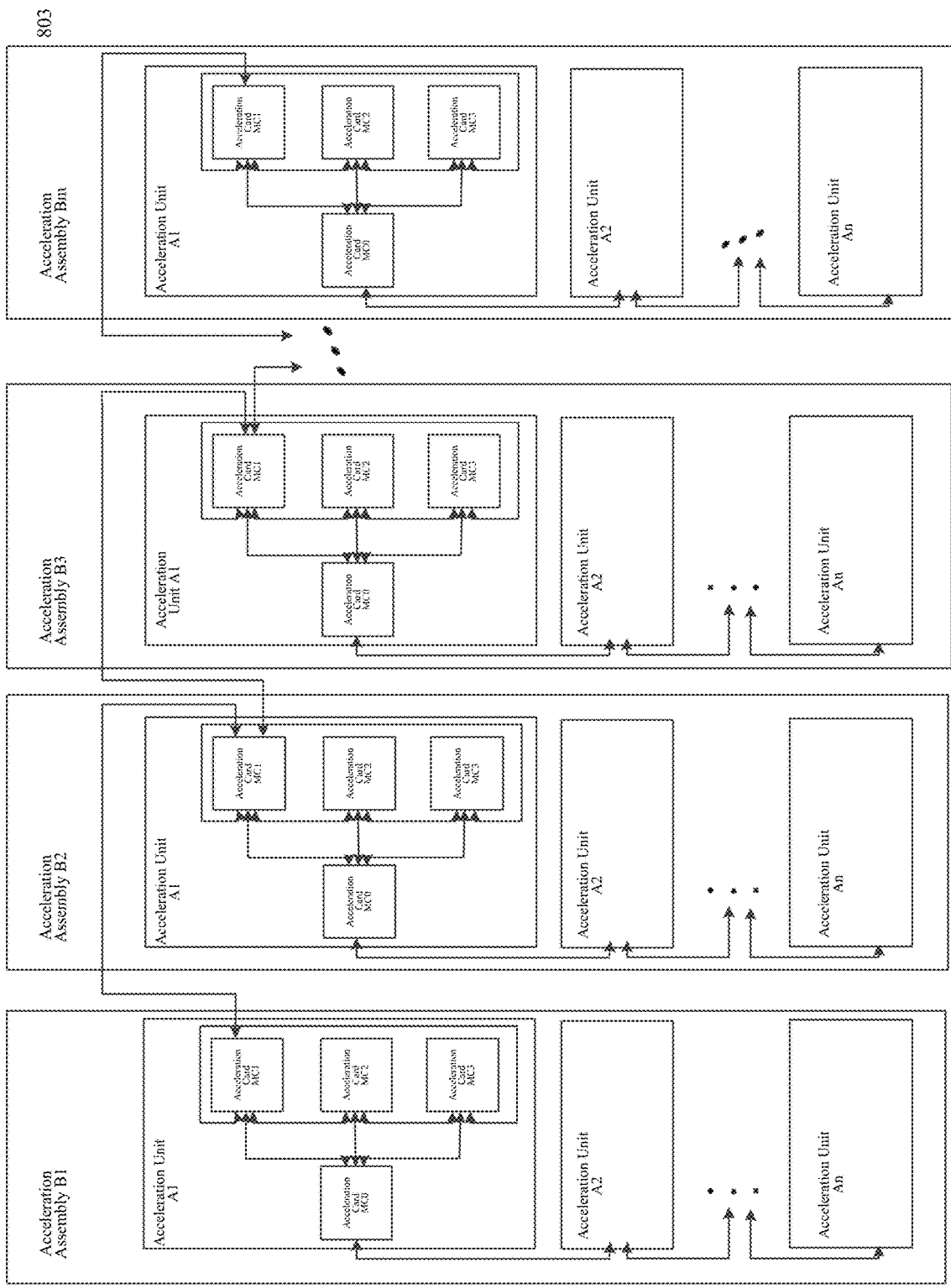
FIG. 16-FIG. 20 are a plurality of schematic diagrams of acceleration devices including a plurality of acceleration assemblies according to embodiments of the present disclosure.

FIG. 16 is a schematic diagram of an acceleration device according to another embodiment of the present disclosure. An acceleration device 900 may include m aforementioned acceleration assemblies. In each acceleration assembly, in addition to external connection ports that are used to connect acceleration units inside the acceleration assembly, there are also idle external connection ports. The acceleration assemblies are interconnected through the idle external connection ports, where an external connection port of an acceleration card MC1 of an acceleration unit A1 in an acceleration assembly B1 may be connected to an external connection port of an acceleration card MC1 of an acceleration unit A1 in an acceleration assembly B2, and the external connection port of the acceleration card MC1 of the acceleration unit A1 in the acceleration assembly B2 may be connected to an external connection port of an acceleration card MC1 of an acceleration unit A1 in an acceleration assembly B3, and so on, and a plurality of acceleration assemblies are interconnected. It may be understood that the acceleration device shown in FIG. 16 is exemplary rather than limiting, and for example, structures of the plurality of acceleration assemblies may be the same or different. For another example, the method in which different acceleration assemblies are connected through idle external connection ports may not be limited to the method shown in FIG. 16, and may also include other methods. For ease of understanding, the following will be described exemplarily in conjunction with FIG. 17-FIG. 25.

Figure 17:
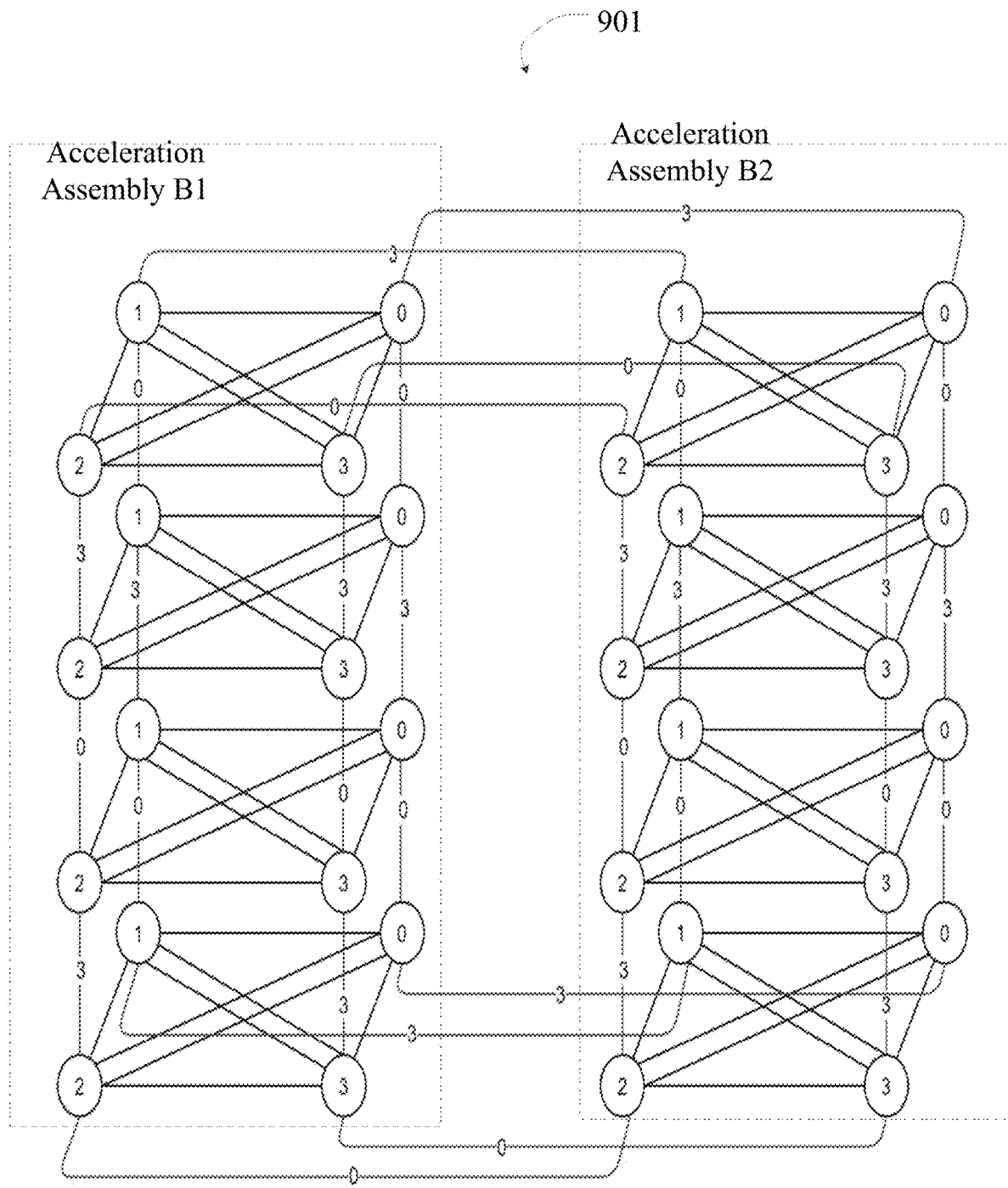

Based on the acceleration device provided in FIG. 16, please further refer to FIG. 17. FIG. 17 is a schematic diagram of a network topology corresponding to the acceleration device according to another embodiment of the present disclosure. An acceleration device 901 may include two acceleration assemblies, where the acceleration assembly B1 may include four acceleration units, and the acceleration assembly B2 may include four acceleration units. A first acceleration unit in the acceleration assembly B1 is connected to a first acceleration unit in the acceleration assembly B2, and a last acceleration unit in the acceleration assembly B1 is connected to a last acceleration unit in the acceleration assembly B2. The total Hop count in this network topology is 9. Those skilled in the art may understand that the network structure composed of a plurality of acceleration units in each acceleration assembly in FIG. 17 is logical, and arrangement positions of the plurality of acceleration units may be adjusted as required in practical applications. The number of acceleration units in each acceleration assembly may not be limited to four as shown in the figure, and may be set more or less as required, and for example, the number of acceleration units in each acceleration assembly may be set to six, eight, etc.

Figure 18:
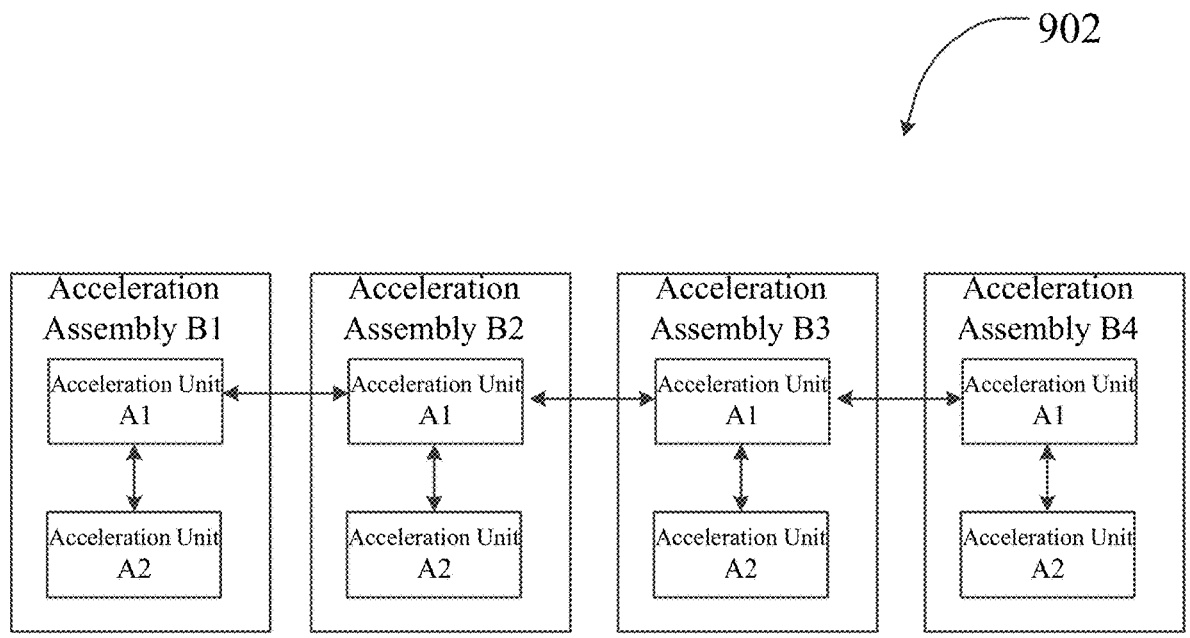

Based on the acceleration device provided in FIG. 16, please further refer to FIG. 18. FIG. 18 is a schematic diagram of an acceleration device according to another embodiment of the present disclosure. An acceleration device 902 may include four acceleration assemblies, which are acceleration assemblies B1, B2, B3, and B4. Among the four acceleration assemblies, each acceleration assembly may include two acceleration units A1 and A2, and each acceleration assembly may be interconnected with one of acceleration units A1 and A2 of other acceleration assemblies through one of the acceleration units A1 and A2 of the acceleration assembly. For example, the acceleration unit A1 in the acceleration assembly B1 is connected to the acceleration unit A1 in the acceleration assembly B2, the acceleration unit A1 in the acceleration assembly B2 is connected to the acceleration unit A1 in the acceleration assembly B3, and the acceleration unit A1 in the acceleration assembly B3 is connected to the acceleration unit A1 in the acceleration assembly B4, where all connections are made through the external connection ports of the acceleration units.

It should be noted that, in addition to the connection methods shown in FIG. 18, there may be many connection methods between the acceleration assemblies. For example, connection methods between the acceleration assemblies may include: the acceleration unit A1 or A2 in the acceleration assembly B1 connecting to the acceleration unit A1 or A2 in the acceleration assembly B2, the acceleration unit A1 or A2 in the acceleration assembly B2 connecting to the acceleration unit A1 or A2 in the acceleration assembly B3, and the acceleration unit A1 or A2 in the acceleration assembly B3 connecting to the acceleration unit A1 or A2 in the acceleration assembly B4.

Figure 19:
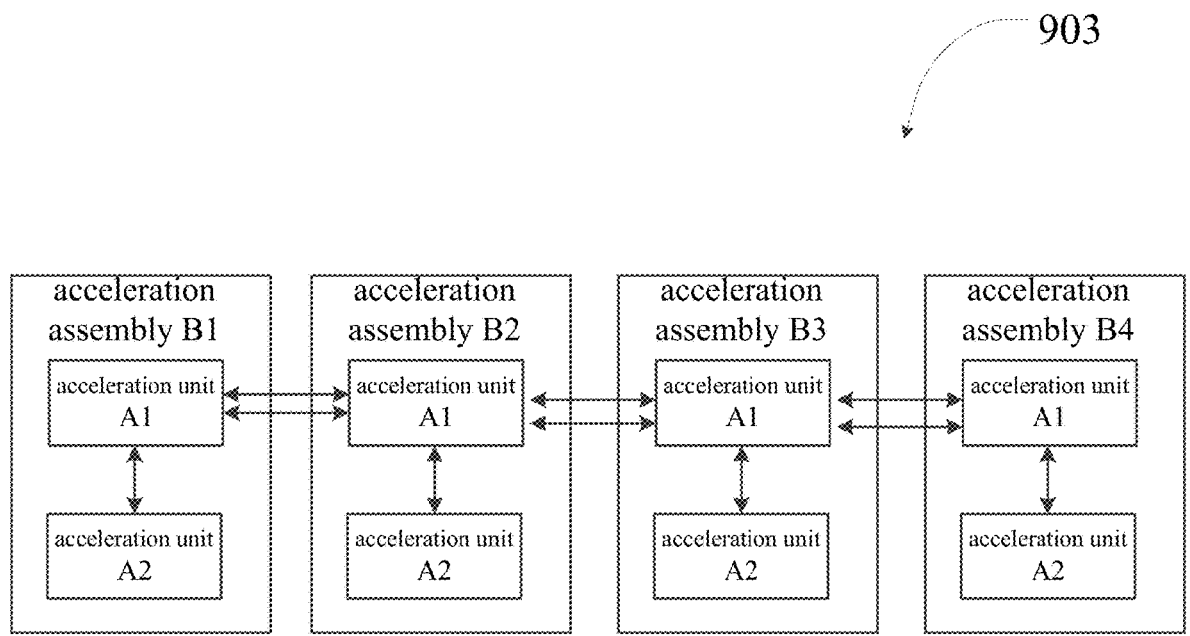

Based on the acceleration device provided in FIG. 18, please further refer to FIG. 19. FIG. 19 is a schematic diagram of an acceleration device according to another embodiment of the present disclosure. In an acceleration device 903 shown in FIG. 19, each acceleration assembly may be interconnected to one of a first acceleration unit and a second acceleration unit of other acceleration assembly using two paths through one of a first acceleration unit and a second acceleration unit of itself. For example, in the figure, a first acceleration unit (such as the acceleration unit A1) in the acceleration assembly B1 may be connected to a first acceleration unit (such as the acceleration unit A1) in the acceleration assembly B2 through two paths, the acceleration unit A1 in the acceleration assembly B2 is connected to the acceleration unit A1 in the acceleration assembly B3 through two paths, and the acceleration unit A1 in the acceleration assembly B3 is connected to the acceleration unit A1 in the acceleration assembly B4 through two paths.

It should be noted that what is marked in FIG. 19 is the connection through two paths, but in practice, there may be connection through more than two paths. For example, in addition to the connection method shown in FIG. 19, connection methods between the acceleration assemblies may further include other methods. For example, the acceleration unit A1 or A2 in the acceleration assembly B1 is connected to the acceleration unit A1 or A2 in the acceleration assembly B2 through two paths, the acceleration unit A1 or A2 in the acceleration assembly B2 is connected to the acceleration unit A1 or A2 in the acceleration assembly B3 through two paths, and the acceleration unit A1 or A2 in the acceleration assembly B3 is connected to the acceleration unit A1 or A2 in the acceleration assembly B4 through two paths.

Figure 20:
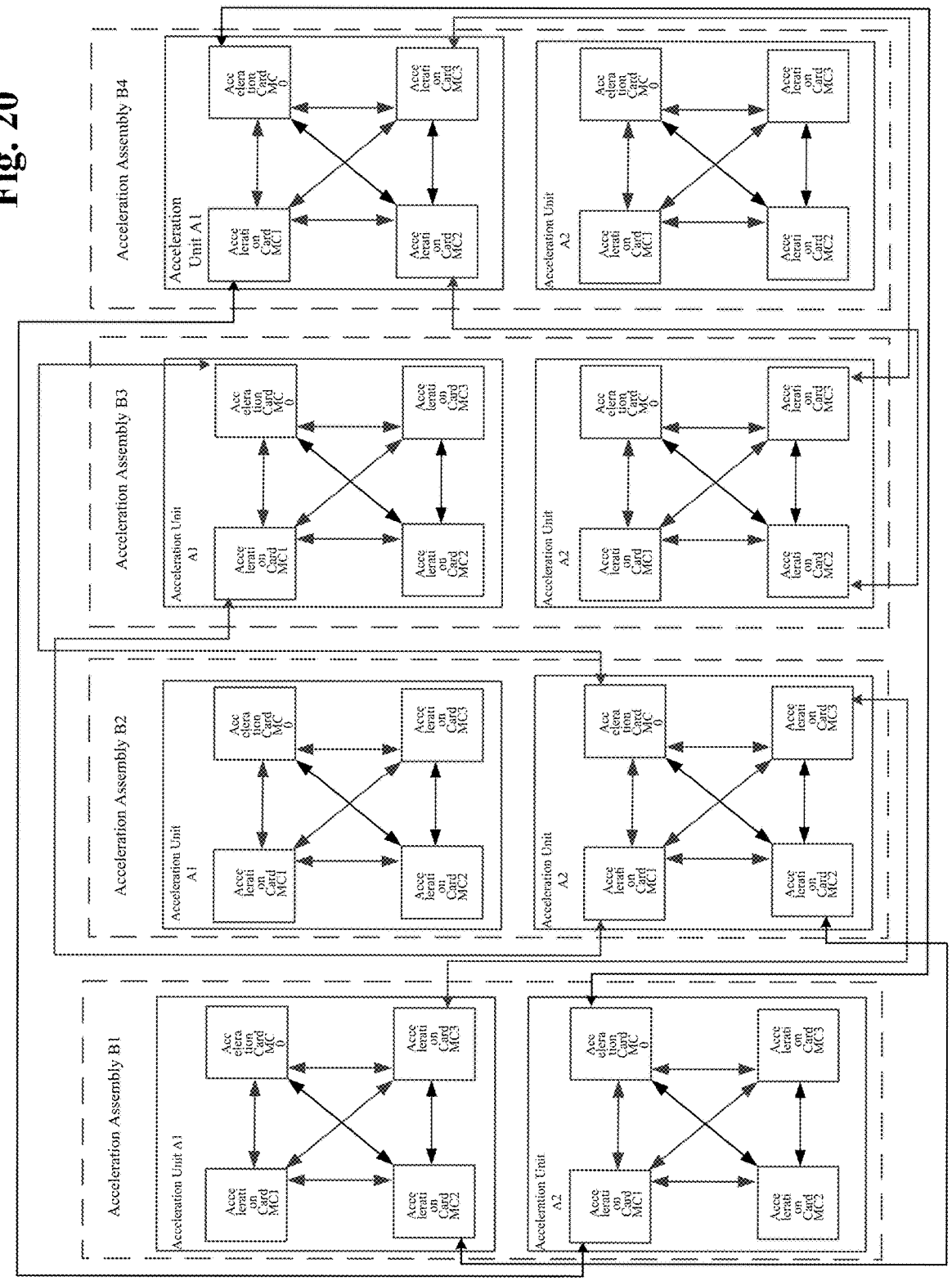

Based on the acceleration device provided in FIG. 16, please further refer to FIG. 20. FIG. 20 is a schematic diagram of an acceleration device according to another embodiment of the present disclosure. An acceleration device 904 may include four acceleration assemblies, which are acceleration assemblies B1, B2, B3 and B4. Each acceleration assembly includes two acceleration units, and each acceleration unit includes two pairs of acceleration cards. In each acceleration unit, MC0 and MC1 are a first pair of acceleration cards, and MC2 and MC3 are a second pair of acceleration cards. The second pair of acceleration cards of the acceleration unit A1 of the acceleration assembly B1 is connected to the second pair of acceleration cards of the acceleration unit A2 of the acceleration assembly B2; the first pair of acceleration cards of the acceleration unit A2 of the acceleration assembly B2 is connected to the first pair of acceleration cards of the acceleration unit A1 of the acceleration assembly B3; the second pair of acceleration cards of the acceleration unit A2 of the acceleration assembly B3 is connected to the second pair of acceleration cards of the acceleration unit A1 of the acceleration assembly B4; and the first pair of acceleration cards of the acceleration unit A1 of the acceleration assembly B4 is connected to the first pair of acceleration cards of the acceleration unit A2 of the acceleration assembly B1.

Figure 21:
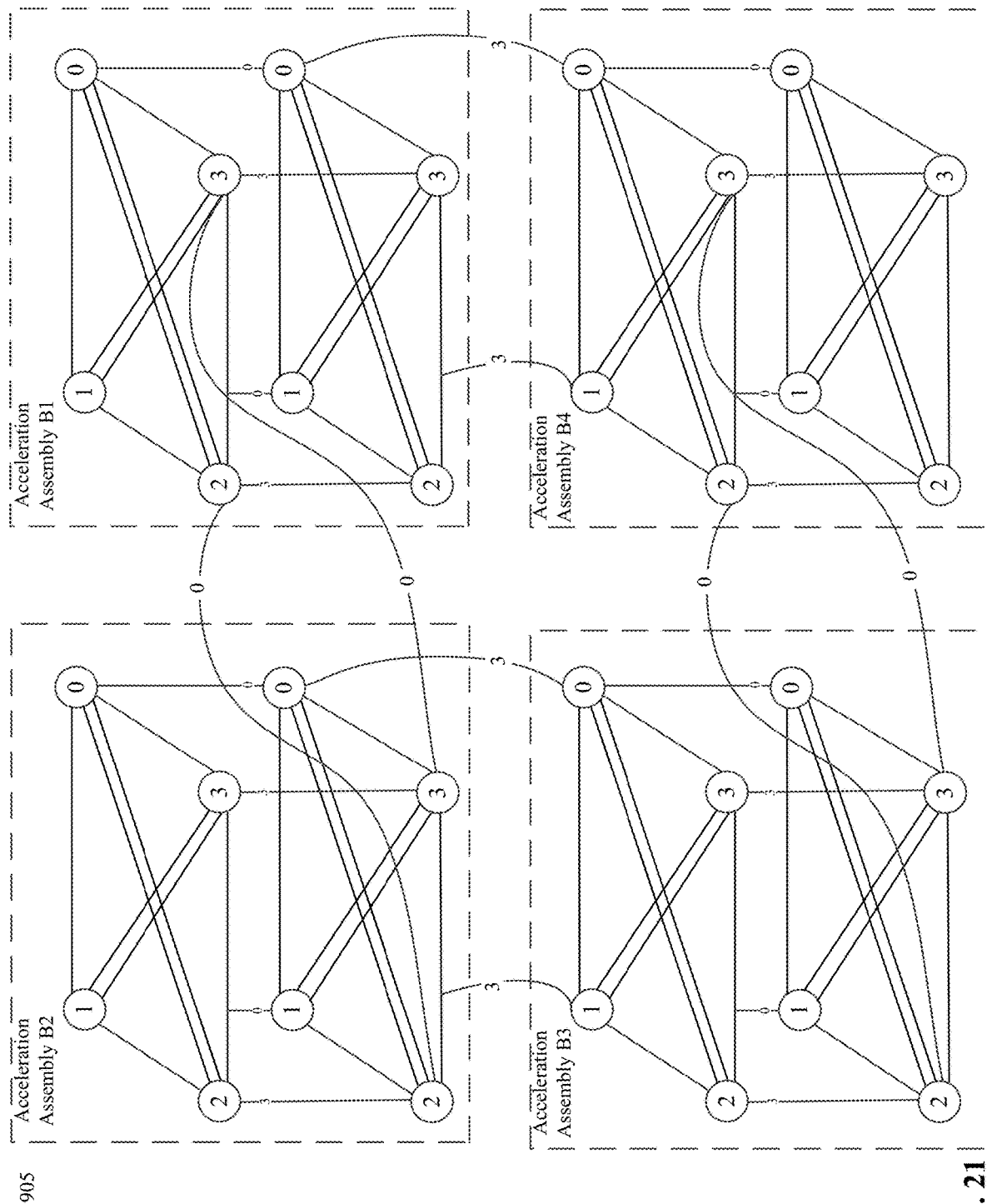
FIG. 21 is a schematic diagram of another network topology of the acceleration device.

Refer to FIG. 21, FIG. 21 is a schematic diagram of another network topology of the acceleration device. An acceleration device 905 shown in FIG. 21 is a specific form of the acceleration device 904 shown in FIG. 20, and therefore the relevant description of the acceleration device 904 may also be applied to the acceleration device 905 in FIG. 21. As shown in FIG. 21, each acceleration assembly of the acceleration device 905 may form a Hybrid Cube Mesh unit, and the interconnection inside each Hybrid Cube Mesh unit is shown in the figure, and the interconnection of 8 nodes and 32 cards of the acceleration device 905 may be realized. Four acceleration assemblies may realize the interconnection of multi-card and multi-nodes through, for example, QSFP-DD (Quad Small Form Factor Pluggable-Double Density) interfaces and cables to form a matrix network topology.

Specifically, in the embodiment, ports 0 of the acceleration cards MC2 and MC3 of the upper-layer node of the acceleration assembly B1 may be connected to the acceleration cards MC2 and MC3 of the lower-layer node of the acceleration assembly B2, respectively; ports 3 of the MC0 and the MC1 of the lower-layer node of the acceleration assembly B2 may be connected to the MC0 and the MC1 of the upper-layer node of the acceleration assembly B3, respectively; ports 0 of the acceleration cards MC2 and MC3 of the lower-layer node of the acceleration assembly B3 may be connected to the acceleration cards MC2 and MC3 of the upper-layer node of the acceleration assembly B4, respectively; and ports 3 of the MC0 and the MC1 of the upper-layer node of the acceleration assembly B4 may be connected to the MC0 and the MC1 of the lower-layer node of the acceleration assembly B1, respectively. The interconnection between the Hybrid Cube Meshes set up in this way may constitute two double-ring structures (as described above in combination with FIGS. 5b, 5c, 12b and 12c), which have the advantages of good reliability and security. And the double-ring structures are suitable for deep learning training, and have high operation efficiency. In the acceleration device 905, the total Hop count of the matrix network topology consisting eight nodes is 11.

Further, as shown in FIG. 21, a first pair of acceleration cards and a second pair of acceleration cards in different acceleration units in the same acceleration assembly may be indirectly connected. For example, in the acceleration assembly B1, the acceleration cards MC0 and MC1 of the upper-layer acceleration unit are indirectly connected to the acceleration cards MC2 and MC3 of the lower-layer acceleration unit.

Figure 22:
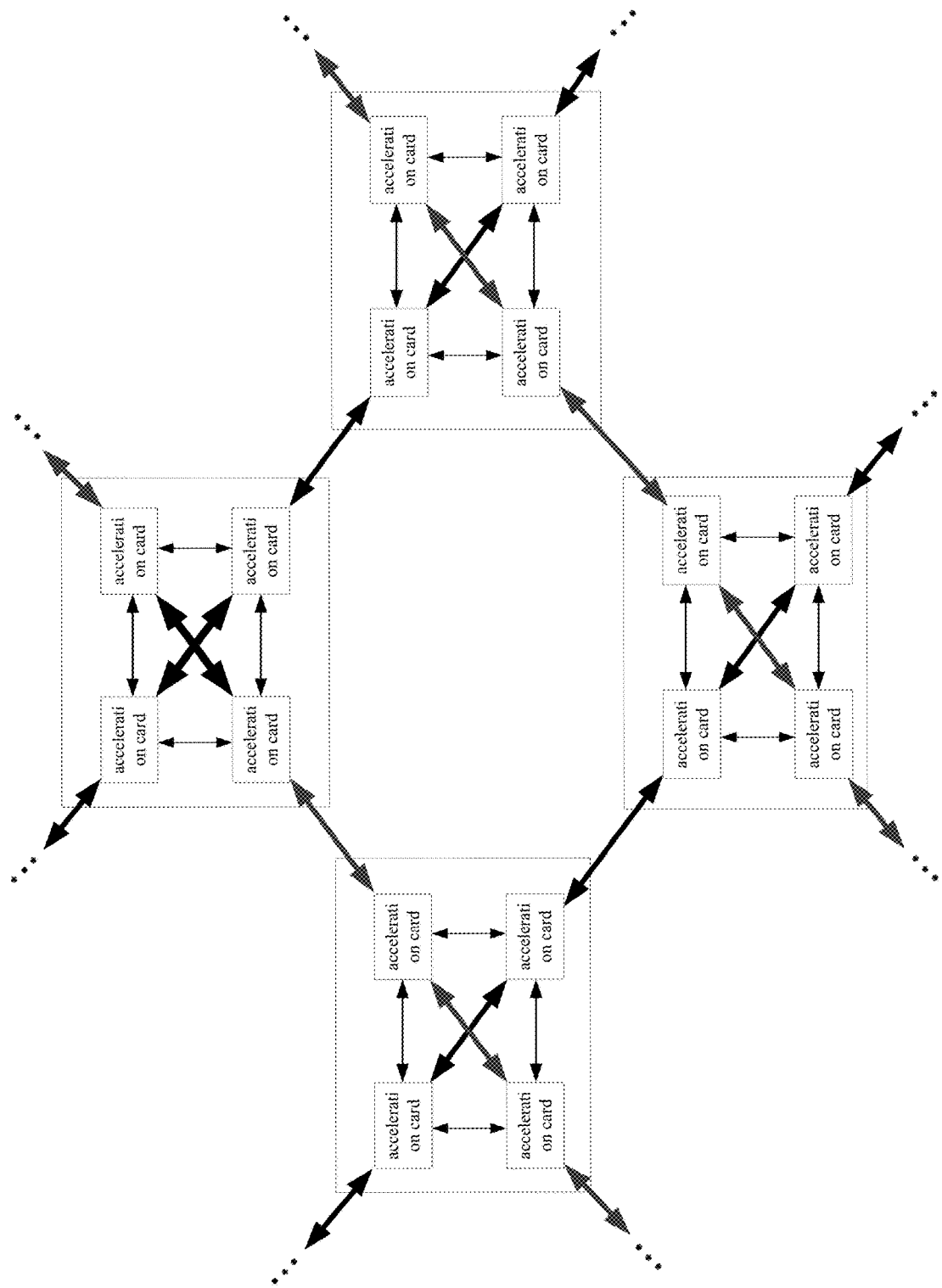
FIG. 22 is a schematic diagram of a matrix network topology based on infinite expansion of an acceleration device.

On the basis of the network topology in FIG. 21, the matrix network topology may be further expanded into a larger network topology with the matrix network topology as the basic unit. FIG. 22 is a schematic diagram of the matrix network topology based on the infinite expansion of the acceleration device. As shown in FIG. 22, an acceleration device 906 may include a plurality of acceleration assemblies, and each acceleration assembly (shown in a box in the figure) may include a plurality of acceleration units (a stereogram is not shown in the FIG. 22, please refer to the structure of the acceleration assembly in FIG. 21). Each acceleration unit may include, and for example, interconnected four acceleration cards shown in the figure, so the matrix network topology may theoretically be expanded infinitely.

Figure 23:
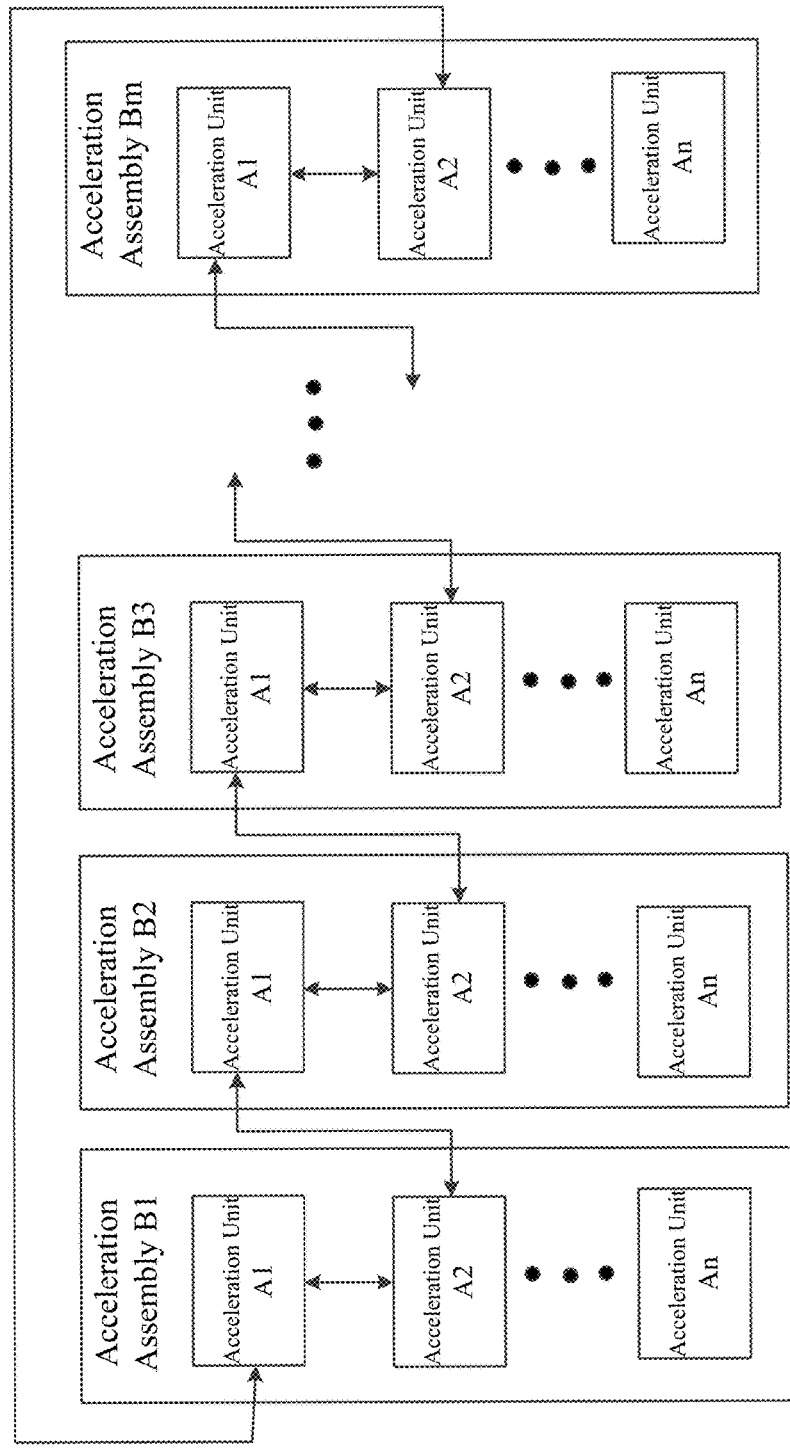
FIG. 23 is a schematic diagram of an acceleration device according to another embodiment of the present disclosure.

Based on the acceleration device provided in FIG. 16, please further refer to FIG. 23. FIG. 23 is a schematic diagram of an acceleration device according to another embodiment of the present disclosure. An acceleration device 908 may include m (m 2) acceleration assemblies, each acceleration assembly may include n (n 2) acceleration units, and the m acceleration assemblies may be connected in a ring. The acceleration unit An of the acceleration assembly B1 may be connected to the acceleration unit A1 of the acceleration assembly B2, and the acceleration unit An of the acceleration assembly B2 may be connected to the acceleration unit A1 of the acceleration assembly B3, and so on, and the acceleration unit An of an acceleration assembly Bm may be connected to the acceleration unit A1 of the acceleration component B1, so that the m acceleration components are connected end to end in a ring-shaped connection.

Figure 24:
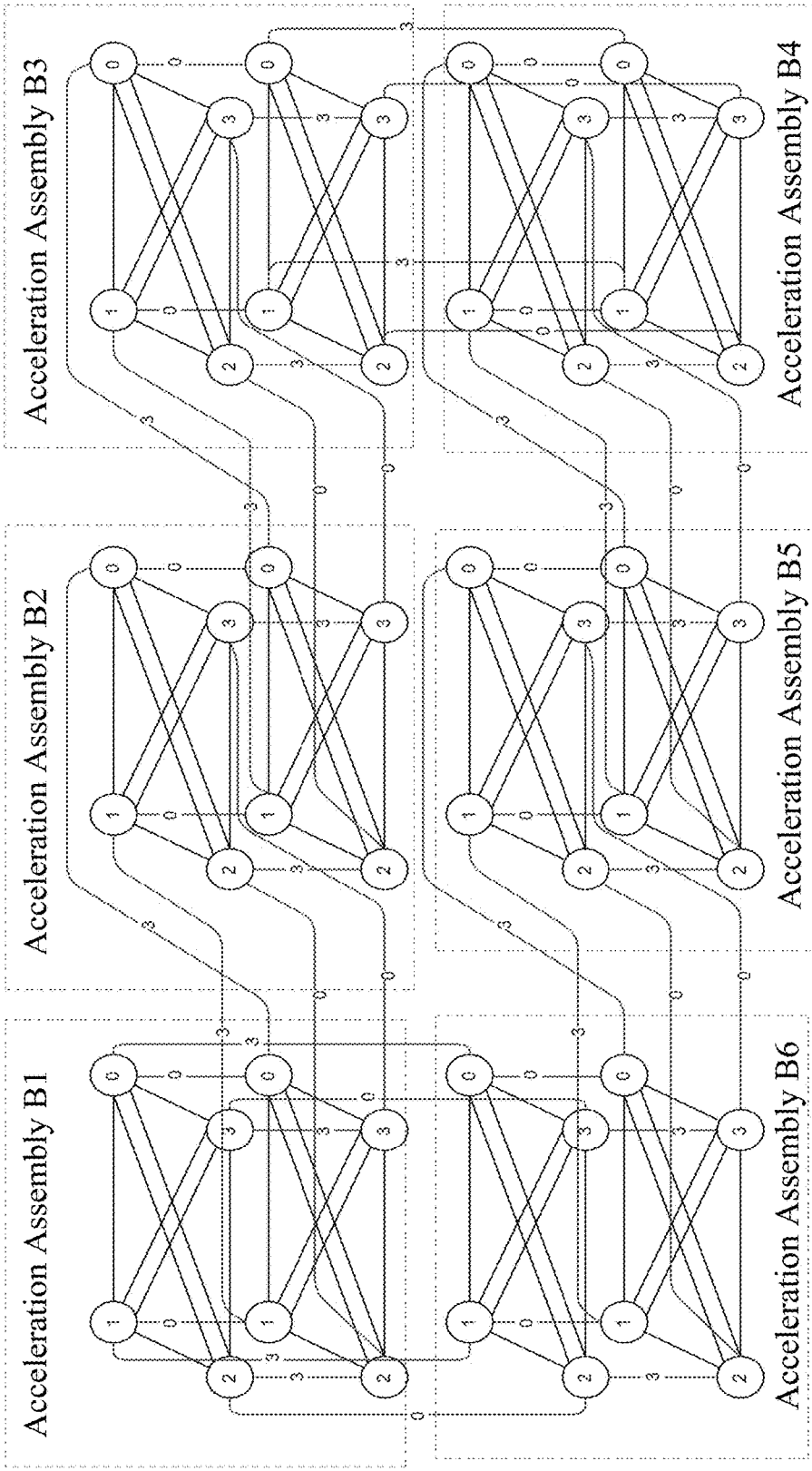
FIG. 24 is a schematic diagram of another network topology of the acceleration device.

Based on FIG. 23, please refer to FIG. 24, FIG. 24 is a schematic diagram of another network topology of the acceleration device. An acceleration device 909 may include 6 acceleration assemblies, where each acceleration assembly may include two acceleration units, and a second acceleration unit of each acceleration assembly may be connected to a first acceleration unit of a next acceleration assembly, so the interconnection of 12 nodes and 48 cards is formed, and then a larger matrix network topology is formed. The total Hop count of this network topology is 13.

Figure 25:
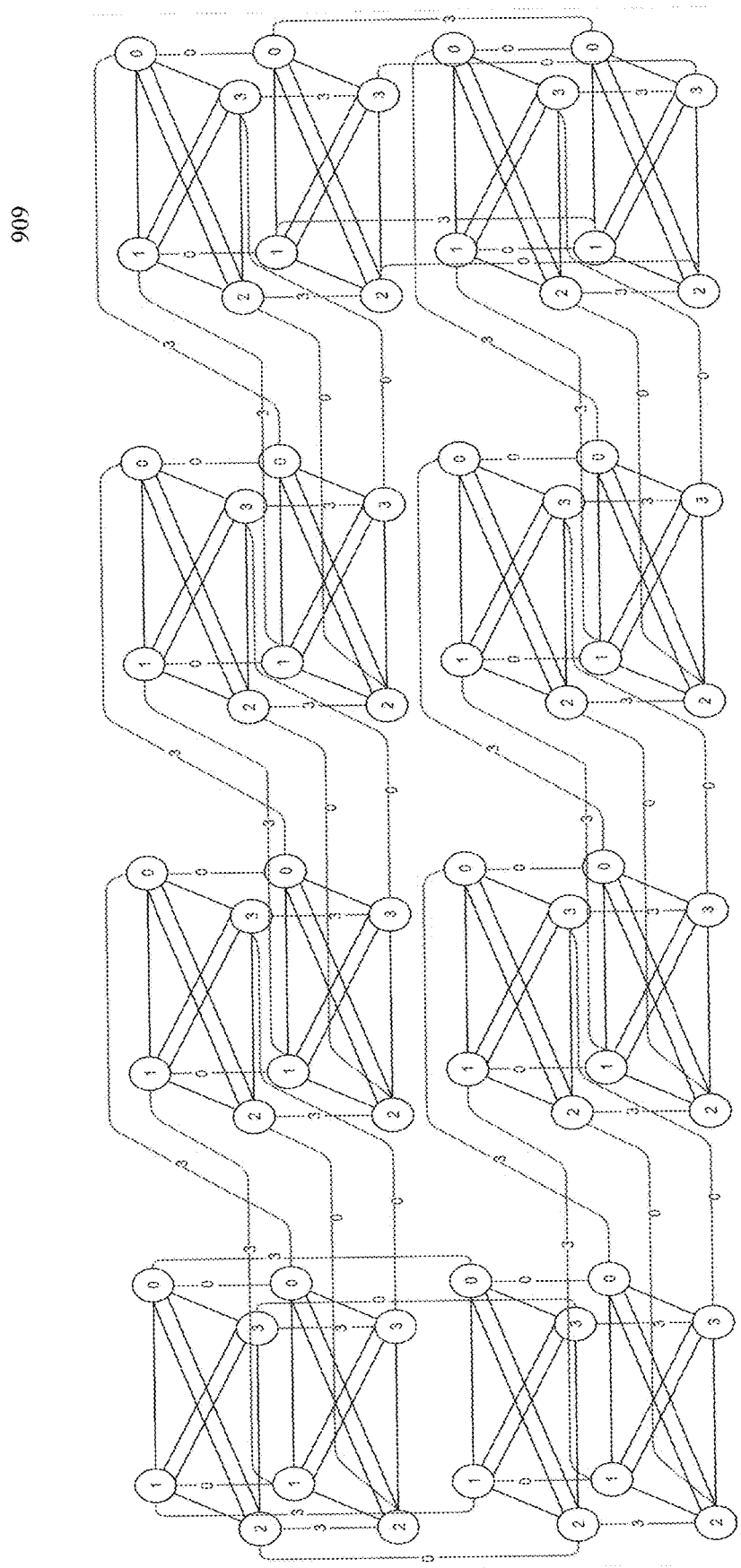
FIG. 25 is a schematic diagram of another network topology of the acceleration device.

Based on FIG. 24, please refer to FIG. 25, FIG. 25 is a schematic diagram of another network topology of the acceleration device. An acceleration device 910 may include 8 acceleration assemblies, where each acceleration assembly may include two acceleration units, and a second acceleration unit of each acceleration assembly may be connected to a first acceleration unit of a next acceleration assembly, so the interconnection of 16 nodes and 64 cards is formed, and then a larger matrix network topology is formed. The total Hop count of this network topology is 17.

On the basis of FIG. 25, the matrix network topology may always be expanded vertically to form a super-large-scale matrix network, such as a super-large-scale matrix network with 20 nodes and 80 cards and a super-large-scale matrix network with 24 nodes and 96 cards. Theoretically, the matrix network may be expanded infinitely, and the total Hop count is the number of nodes plus one. By optimizing the interconnection method between nodes, the time delay of the whole system may be minimized, and the real-time requirement of the system while processing massive data to the maximum extent may be met.

The acceleration device including a plurality of acceleration assemblies has been described above in conjunction with FIGS. 16-25. Those skilled in the art may understand that the above description is exemplary rather than restrictive. For example, the number of acceleration assemblies, structures of the acceleration assemblies, and connection relationships between the acceleration assemblies may be adjusted as required. Those skilled in the art may also combine the foregoing embodiments to form an acceleration device as required, which is also within the protection scope of the present disclosure.

In addition, it should be noted that the acceleration card matrix, the fully connected square network (topology), the Hybrid Cube Mesh (topology), and the matrix network (topology) described in the present disclosure are all logical, and the specific layout forms may be adjusted as required.

The topology disclosed in the present disclosure may also perform a data reduction operation. The reduction operation may be performed in each acceleration card, each acceleration unit, and in the acceleration device. The specific reduction operation steps are as follows.

Taking a ReduceSum operation as an example, processes of the reduction operation performed in an acceleration unit may include: transferring data stored in a first acceleration card to a second acceleration card, and in the second acceleration card, performing an addition operation on data originally stored in the second acceleration card and the data received from the first acceleration card; next, transferring a result of the addition operation performed in the second acceleration card to a third acceleration card, and then performing the addition operation, and so on, until all data stored in the acceleration cards have been added, and all acceleration cards have received a final operation result.

Taking the acceleration unit shown in FIG. 4 as an example, data (0,0) is stored in the acceleration card MC0, data (1,2) is stored in the acceleration card MC1, data (3,1) is stored in the acceleration card MC2, and data (2,4) is stored in the acceleration card MC3. The data (0,0) in the acceleration card MC0 is transferred to the acceleration card MC1, and a result (1,2) is obtained after the addition operation; next, the result (1,2) is transferred to the acceleration card MC2 to obtain a next result (4,3); then, the next result (4,3) is transferred to the acceleration card MC3 to obtain a final result (6,7).

Afterwards, during the reduction operation of the present disclosure, the final result (6, 7) is continuously transferred to acceleration cards MC0, MC1, MC2 and MC3, so that data (6, 7) is stored in all the acceleration cards, Thus, the reduction operation is completed in the acceleration unit.

The acceleration unit shown in FIG. 4 may form two independent rings, and each ring may complete the reduction operation of half of the data, thereby speeding up the operation and improving the operation efficiency.

In addition, when the above-mentioned acceleration unit performs the reduction operation, a plurality of acceleration cards may perform parallel operations, thereby speeding up the operation speed. For example, the data (0, 0) is stored in the acceleration card MC0, the data (1,2) is stored in the acceleration card MC1, the data (3,1) is stored in the acceleration card MC2, and the data (2,4) is stored in the acceleration card MC3. Part of data (0) in the acceleration card MC0 may be transferred to the acceleration card MC1, and a result (1) may be obtained after the addition operation; and part of data (2) in the acceleration card MC1 may be transferred to the acceleration card MC2 synchronously, and a result (3) may be obtained after the addition operation, thereby realizing the parallel operation of the acceleration cards MC1 and MC2; and so on, the whole reduction operation is completed.

The above-mentioned parallel operation may also include: groups of acceleration units performing addition operations first, and then performing the reduction operation on a result of this group of acceleration units with a result of another group of acceleration units. For example, the data (0,0) is stored in the acceleration card MC0, the data (1,2) is stored in the acceleration card MC1, the data (3,1) is stored in the acceleration card MC2, and the data (2,4) is stored in the acceleration card MC3; the data in the acceleration card MC0 may be transferred to the acceleration card MC1 for operation to obtain a first set of result (1, 2); synchronously or asynchronously, the data in the acceleration card MC2 may be transferred to the acceleration card MC3 for operation to obtain a second set of result (5,5). Next, the reduction operation is performed on the first set of result and the second set of result to obtain the final reduction result (6,7).

Similarly, in addition to performing the reduction operation in an acceleration unit, the reduction operation may also be performed in an acceleration assembly or an acceleration device. It should be understood that the acceleration device may also be regarded as an acceleration assembly connected end-to-end.

When the reduction operation is performed in the acceleration assembly or the acceleration device, the processes of the reduction operation may include: performing a first reduction operation on data in acceleration cards of the same acceleration unit to obtain a first reduction result in each acceleration unit; and performing a second reduction operation on first reduction results in a plurality of acceleration units to obtain a second reduction result.

Also taking the ReduceSum operation as an example, the first step has been described above. For an acceleration device including a plurality of acceleration units, a local reduction operation may be performed in each acceleration unit first, and after the reduction operation in each acceleration unit is completed, the acceleration cards in the same acceleration unit may obtain a result of the local reduction operation, which is called first reduction result.

Next, the first reduction results in all the acceleration units may be transferred to adjacent acceleration units and added. Thus, similar to performing the reduction operation in the acceleration unit, the first acceleration unit transfers the first reduction result to the second acceleration unit; and after the addition operation is performed in the acceleration cards of the second acceleration unit, the obtained results are transferred and added. After the last addition operation is performed, a final result is transferred to each acceleration unit.

It should be pointed out that since the above acceleration assemblies are not necessarily connected end-to-end, when the final result is transferred to each acceleration unit, the final result may be transferred in reverse rather than in a loop as acceleration units are connected end-to-end. The technical solution of the present disclosure does not specifically limit how to transfer the final result.

Further, according to an embodiment of the present disclosure, the acceleration device may be configured to perform the reduction operation, and the processes may include: performing a first reduction operation on data in acceleration cards of the same acceleration unit to obtain a first reduction result; performing an intermediate reduction operation on first reduction results in a plurality of acceleration units of the same acceleration unit to obtain an intermediate reduction result; and performing a second reduction operation on intermediate reduction results in a plurality of acceleration assemblies to obtain a second reduction result.

In the embodiment, the reduction operation may be performed first in the same acceleration unit, which has been described above and will not be repeated herein.

Next, the reduction operation may be performed in each acceleration assembly, so that each acceleration card in each acceleration assembly may obtain the local reduction result in this acceleration assembly; and then, with the acceleration assembly as a unit, the reduction operation is performed in the plurality of acceleration assemblies, so that each acceleration card may obtain a global reduction result in the acceleration device.

Figure 26:
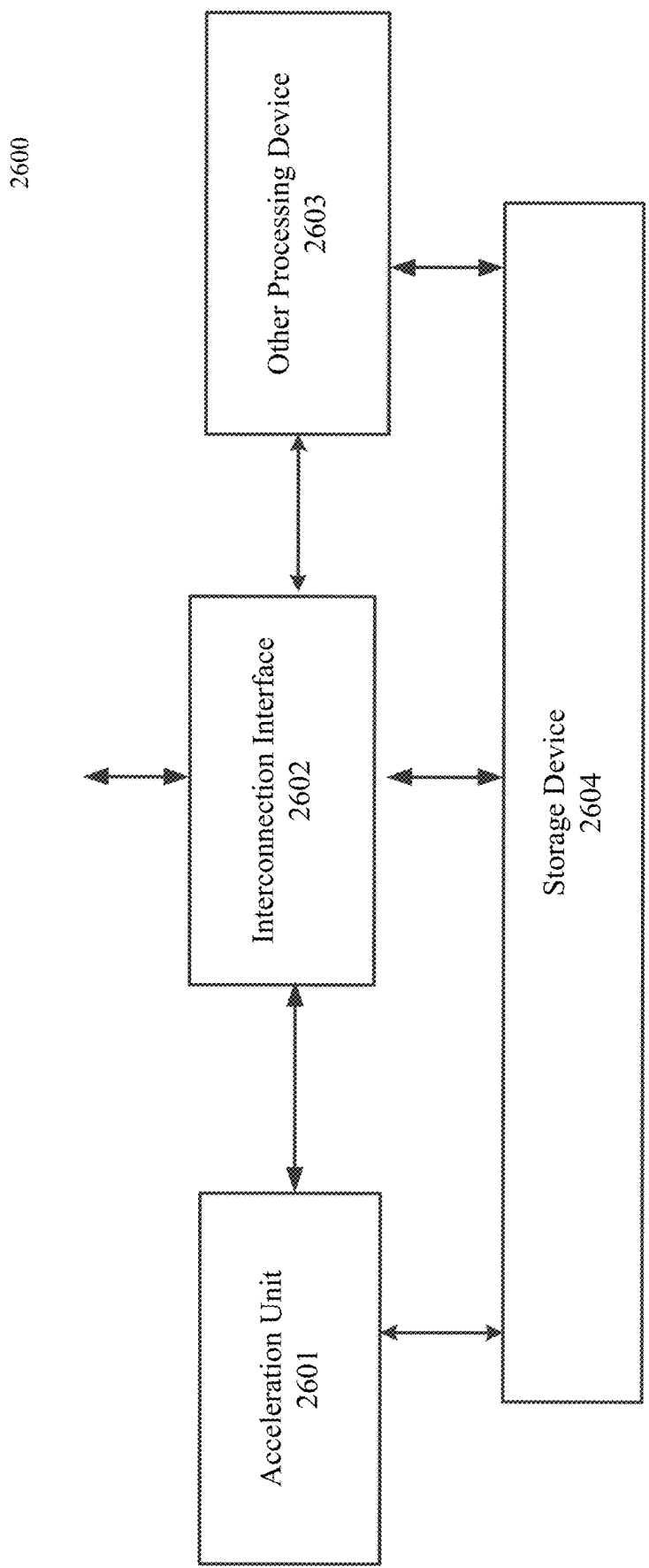
FIG. 26 is a schematic structural diagram of a combined processing device according to an embodiment of the present disclosure.

It should be understood that the above transferring order is only for convenience of description, and is not necessarily such a transferring order. FIG. 26 is a schematic structural diagram of a combined processing device according to an embodiment of the present disclosure. As shown in FIG. 26, a combined processing device 2600 may include an acceleration unit 2601, and specifically, the acceleration unit 2601 may be the acceleration unit shown in FIGS. 1 to 5. In addition, the combined processing device also includes an interconnection interface 2602 and other processing device 2603. In the present disclosure, the acceleration unit 2601 may interact with other processing device 2603 through the interconnection interface 2602 to jointly complete operations specified by users.

According to the solution of the present disclosure, the other processing device may include one or more types of processors, such as an MCU (micro-processing unit), a BMC (baseboard management controller), and a central processing unit. The number of processors is not limited but determined according to actual needs. In one or a plurality of embodiments, the other processing device may serve as interfaces between the acceleration unit of the present disclosure and external data and control. Other processing device may perform basic controls that include but are not limited to data moving, and starting and/or stopping the acceleration unit. The other processing device may also cooperate with the acceleration unit to complete operation tasks.

Optionally, the combined processing device 2600 may further include a storage device 2604, and the storage device 2604 may be connected to the acceleration unit 2601, the interconnection interface 2602, and other processing device 2603, respectively. In one or a plurality of embodiments, the storage device 2604 is configured to store data of the acceleration unit 2601 and other processing device 2603, and is particularly suitable for data that may not be fully stored in the internal or on-chip memories of the acceleration unit 2601 and other processing device 2603.

In some application scenarios, the combined processing device 2600 of the present disclosure may be used. For example, in large-scale data centers, supercomputing centers, cloud computing centers, etc., and may be used to build high-performance processor clusters to realize real-time processing of massive data.

Figure 27:
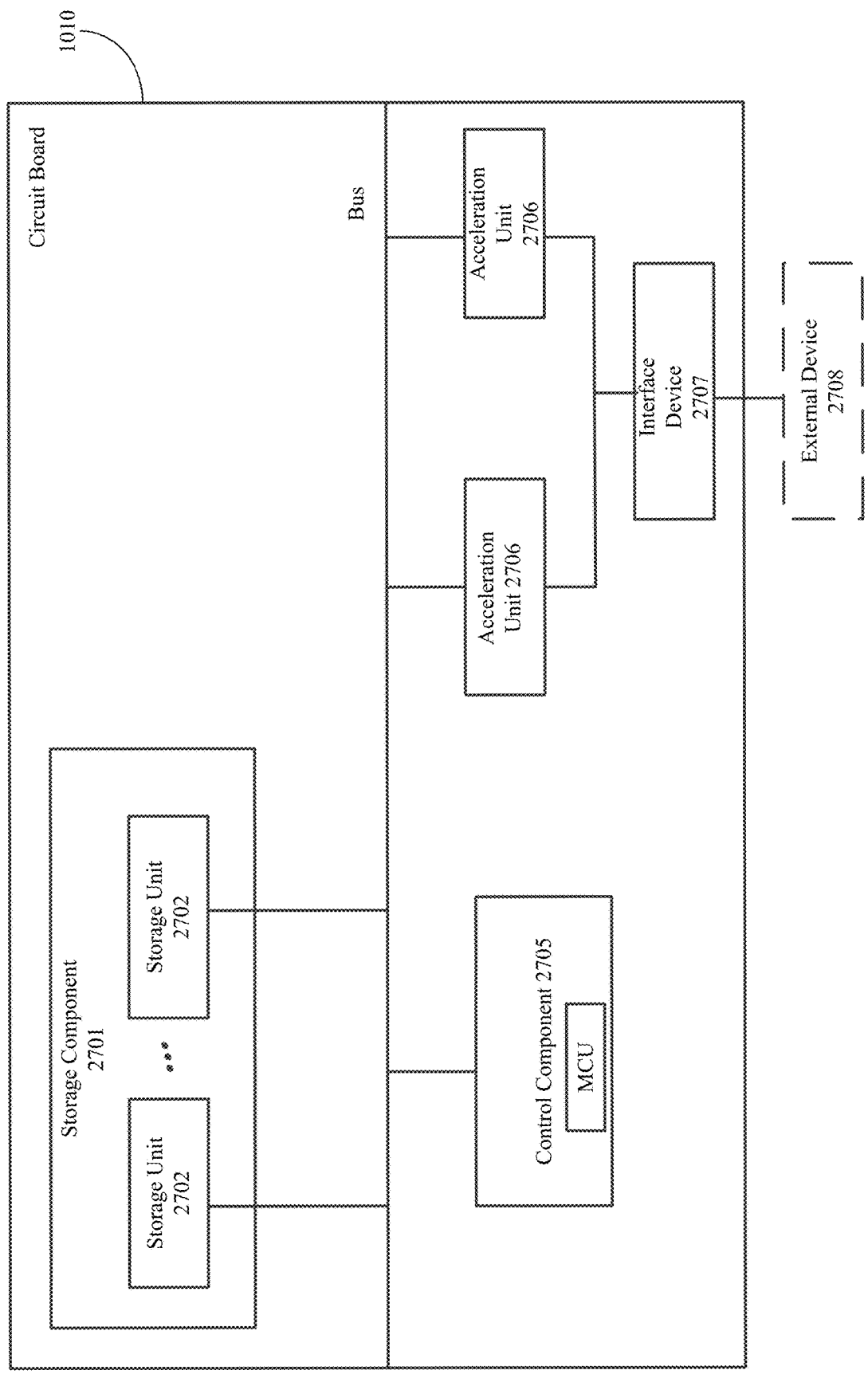
FIG. 27 is a schematic structural diagram of a board card according to an embodiment of the present disclosure.

In some embodiments, the present disclosure also discloses a circuit board, including the acceleration unit above. Referring to FIG. 27, the present disclosure provides an exemplary circuit board 2700. In addition to one or more acceleration units 2706 (two are shown in the figure as an example) described above, the circuit board 2700 may further include other matching components. The matching components include but are not limited to a storage component 2701, an interface device 2707, and a control component 2705.

The storage component 2701 is connected to the acceleration unit 2706 through a bus, and is configured to store data. The storage component 2701 may include a plurality of groups of storage units 2702. Each group of the storage units 2702 may be connected to the acceleration unit 2706 by the bus. It may be understood that each group of the storage units 2702 may be at least one of DDR SDRAM (Double Data Rate Synchronous Dynamic Random Access Memory), HBM (High Broadband Memory), and the like.

The DDR may double the speed of the SDRAM without increasing clock frequency. The DDR allows data to be read on rising and falling edges of a clock pulse. A speed of the DDR is twice that of a standard SDRAM. In an embodiment, the storage component 2701 may include 4 groups of the storage units 2702. Each group of the storage units 2702 may include a plurality of DDR4 particles (chips). In an embodiment, four 72-bit DDR4 controllers may be arranged inside the chip, where 64 bits of each 72-bit DDR4 controller are used for data transfer and 8 bits are used for ECC (Error Correcting Code) check-out.

In an embodiment, each group of the storage units 2702 may include a plurality of DDR SDRAMs arranged in parallel. The DDR may transfer data twice per clock cycle. A DDR controller may be arranged in the acceleration unit 2706 and may be used for controlling data transfer and data storage of each storage unit. The interface device 2707 may be connected to the acceleration unit 2706. The interface device 2707 is configured to transfer data between the acceleration unit 2706 and an external device 2708 (such as a server or a computer). In an embodiment, the interface device 2707 may be a standard PCIE (Peripheral Component Interconnect Express) interface. For instance, data to be processed may be transferred from the server through the standard PCIE interface to the acceleration unit 2706, thereby realizing data transfer. In another embodiment, the interface device 2707 may also be other interfaces. The present disclosure does not restrict a specific form of another interface, as long as the interface device may realize a transferring function. In addition, a computation result of the acceleration unit 2706 may still be transferred by the interface device 2707 to the external device (such as the server). The control component 2705 may be connected to the acceleration unit 2706. The control component 2705 may be configured to monitor the status of the acceleration unit

2706. Specifically, the acceleration unit 2706 and the control component 2705 may be electrically connected through an SPI (Serial Peripheral Interface). The control component 2705 may include an MCU (micro controller unit).

In some embodiments, the present disclosure also discloses an electronic device or apparatus, including the acceleration unit above. In some embodiments, the present disclosure also discloses another electronic device or apparatus, including the acceleration assembly above. In some embodiments, the present disclosure also discloses another electronic device or apparatus, including the acceleration device above. In some embodiments, the present disclosure also discloses an electronic device or apparatus, including the circuit board above.

Depending on the application scenario, the electronic devices or apparatuses may include, for example, data processing devices, data centers, supercomputing centers, cloud computing centers, servers, and cloud servers.

In the foregoing embodiments of the present disclosure, the description of each implementation has its own emphasis. For the parts that are not described in detail in an embodiment, reference may be made to related descriptions in other embodiments. The technical features of the above-described embodiments may be arbitrarily combined, and not all possible combinations of the technical features of the above-described embodiments have been described to make the description concise. However, as long as there is no contradiction in the combinations of the technical features, the combinations of the technical features shall fall within the scope of the specification.

The foregoing may be better understood according to following articles:

A1. An acceleration unit, comprising M acceleration cards of this acceleration unit, where each acceleration card of this acceleration unit includes an internal connection port, and each acceleration card of this acceleration unit is connected to other acceleration cards of this acceleration unit through the internal connection port, where the M acceleration cards of this acceleration unit logically form an acceleration card matrix with a scale of L*N, and L and N are integers not less than 2.

A2. The acceleration unit of A1, where the M acceleration cards of this acceleration unit logically form a 2*2, 3*3, or 4*4 acceleration card matrix.

A3. The acceleration unit of A1 or A2, where each acceleration card of this acceleration unit is connected with at least one other acceleration card of this acceleration unit through two paths.

A4. The acceleration unit of any one of A1-A3, where acceleration cards of this acceleration unit at opposite corners of the acceleration card matrix are connected through two paths.

A5. The acceleration unit of any one of A1-A4, where at least one of the M acceleration cards of this acceleration unit includes an external connection port.

A6. The acceleration unit of any one of A1-A5, where, when the acceleration unit includes four acceleration cards of this acceleration unit, each acceleration card of this acceleration unit includes six ports, where four ports of each acceleration card of this acceleration unit are internal connection ports for connecting with other three acceleration cards of this acceleration unit, and remaining two ports of at least one acceleration card of this acceleration unit are external connection ports for connecting with acceleration cards of other acceleration units.

A7. The acceleration unit of any one of A1-A6, where the internal connection ports and external connection ports are SerDes ports.

A8. The acceleration unit of any one of A1-A7, where the acceleration unit is configured to perform a reduction operation on data in the acceleration card of the acceleration unit to obtain a reduction result.

A9. The acceleration unit of A4, where the acceleration card matrix includes two independent rings, and each ring completes a part of operations.

A10. An electronic device, comprising the acceleration unit of any one of A1-A9.

B1. An acceleration assembly, comprising a plurality of acceleration units, where each acceleration unit includes M acceleration cards of this acceleration unit, each acceleration card of this acceleration unit includes an internal connection port, and each acceleration card of this acceleration unit is connected to other acceleration cards of this acceleration unit through the internal connection port, where the M acceleration cards of this connection unit logically form an acceleration card matrix with a scale of L*N, and L and N are integers not less than 2, at least one of the M acceleration cards of this acceleration unit includes an external connection port, and the acceleration units are connected through the external connection port.

B2. The acceleration assembly of B1, where the M acceleration cards of this acceleration unit logically form a 2*2, 3*3, or 4*4 acceleration card matrix.

B3. The acceleration assembly of B1 or B2, where each acceleration card of this acceleration unit is connected with at least one other acceleration cards of this acceleration unit through two paths.

B4. The acceleration assembly of B2 or B3, where acceleration cards of this acceleration unit at opposite corners of the acceleration card matrix are connected through two paths.

B5. The acceleration assembly of any one of B1-B4, where, when the acceleration unit includes four acceleration cards of this acceleration unit, and each acceleration card of this acceleration unit includes six ports, where four ports of each acceleration card of this acceleration unit are internal connection ports for connecting with other three acceleration cards of this acceleration unit, and remaining two ports of at least one acceleration card of this acceleration unit are external connection ports for connecting with acceleration cards of other acceleration units.

B6. The acceleration assembly of any one of B1-B5, where the internal connection ports and external connection ports are SerDes ports.

B7. The acceleration assembly of any one of B1-B6, where the plurality of acceleration units are logically in a multi-layer structure, each layer includes an acceleration unit, and acceleration cards of each acceleration unit are connected to acceleration cards of other acceleration units through an external connection port.

B8. The acceleration assembly of any one of B1-B7, where the plurality of acceleration units have a same structure.

B9. The acceleration assembly of any one of B1-B8, where the acceleration unit is configured to perform a reduction operation on data in the acceleration card of the acceleration unit to obtain a reduction result.

B10. The acceleration assembly of any one of B1-B9, where the acceleration assembly is configured to perform the reduction operation, which includes: performing a first reduction operation on data in acceleration cards of a same acceleration unit to obtain a first reduction result in each acceleration unit; and performing a second reduction operation on first reduction results in a plurality of acceleration units to obtain a second reduction result.

B11. An acceleration device, comprising a plurality of acceleration units, where each acceleration unit includes M acceleration cards of this acceleration unit, each acceleration card of this acceleration unit includes an internal connection port, and each acceleration card of this acceleration unit is connected to other acceleration cards of this acceleration unit through the internal connection port, where the M acceleration cards of this acceleration unit logically form an acceleration card matrix with a scale of L*N, and L and N are integers not less than 2, where at least one of the M acceleration cards of this acceleration unit includes an external connection port, and the acceleration units are connected through the external connection port; where the plurality of acceleration units are logically in a multi-layer structure, each layer includes an acceleration unit, the acceleration cards of each acceleration unit are connected to acceleration cards of other acceleration units through an external connection port, and a last acceleration unit is connected to a first acceleration unit, so that the plurality of acceleration units are connected end to end to form a ring structure.

B12. The acceleration device of B11, where the M acceleration cards of this acceleration unit logically form a 2*2, 3*3 or 4*4 acceleration card matrix.

B13. The acceleration device of B11 or B12, where each acceleration card of this acceleration unit is connected with at least one other acceleration cards of this acceleration unit through two paths.

B14. The acceleration device of B12 or B13, where acceleration cards of this acceleration unit at opposite corners of the acceleration card matrix are connected through two paths.

B15. The acceleration device of any one of B11-B14, where, when the acceleration unit includes four acceleration cards of this acceleration unit, and each acceleration card of this acceleration unit includes six ports, where four ports of each acceleration card of this acceleration unit are internal connection ports for connecting with other three acceleration cards of this acceleration unit, and remaining two ports of at least one acceleration card of this acceleration unit are external connection ports for connecting with acceleration cards of other acceleration units.

B16. The acceleration device of any one of B11-B15, where the internal connection ports and external connection ports are SerDes ports.

B17. The acceleration device of any one of B11-B16, where the acceleration device is configured to perform a reduction operation, which includes: performing a first reduction operation on data in acceleration cards of a same acceleration unit to obtain a first reduction result in each acceleration unit; and performing a second reduction operation on the first reduction results in a plurality of acceleration units to obtain a second reduction result.

B18. An acceleration device, comprising a plurality of acceleration assemblies of any one of B1-10, where the plurality of acceleration assemblies are connected to each other through idle external connection ports.

B19. The acceleration device of B18, where the acceleration device includes four acceleration assemblies, each acceleration assembly includes a first acceleration unit and a second acceleration unit, and each acceleration assembly is interconnected with one of a first acceleration unit and a second acceleration unit of other acceleration assembly through one of the first acceleration unit and the second acceleration unit of itself.

B20. The acceleration device of B19, where each acceleration assembly is interconnected to one of the first acceleration unit and the second acceleration unit of other acceleration assembly using at least two paths through one of the first acceleration unit and the second acceleration unit of itself.

B21. The acceleration device of B19, where the four acceleration assemblies include a first acceleration assembly, a second acceleration assembly, a third acceleration assembly, and a fourth acceleration assembly, where a second pair of acceleration cards of a first acceleration unit of the first acceleration assembly is connected to a second pair of acceleration cards of a second acceleration unit of the second acceleration assembly; a first pair of acceleration cards of the second acceleration unit of the second acceleration assembly is connected to a first pair of acceleration cards of a first acceleration unit of the third acceleration assembly; a second pair of acceleration cards of a second acceleration unit of the third acceleration assembly is connected to a second pair of acceleration cards of a first acceleration unit of the fourth acceleration assembly; and a first pair of acceleration cards of the first acceleration unit of the fourth acceleration assembly is connected to a first pair of acceleration cards of a second acceleration unit of the first acceleration assembly.

B22. The acceleration device of B21, where a first pair of acceleration cards and a second pair of acceleration cards in different acceleration units in a same acceleration assembly are indirectly connected.

B23. The acceleration device of B18, where the acceleration device includes a plurality of acceleration assemblies connected in a ring, where a second acceleration unit of each acceleration assembly is connected to a first acceleration unit of a next acceleration assembly, so that the plurality of acceleration assemblies are connected end to end.

B24. The acceleration device of any one of B18-B23, where the acceleration device is configured to perform a reduction operation, which includes: performing a first reduction operation on data in acceleration cards of a same acceleration unit to obtain a first reduction result; performing an intermediate reduction operation on first reduction results in a plurality of acceleration units of a same acceleration assembly to obtain an intermediate reduction result; and performing a second reduction operation on intermediate reduction results in a plurality of acceleration assemblies to obtain a second reduction result.

B25. An electronic device, comprising the acceleration assembly of any one of B1-B10 or the acceleration device of any one of B11-B24.

It should be understood that terms such as "first", "second", "third", and "fourth" in the claims, the specification, and drawings are used for distinguishing different objects rather than describing a specific order. It should be understood that terms "including" and "comprising" used in the specification and the claims indicate the presence of a feature, an entity, a step, an operation, an element, and/or a assembly, but do not exclude the existence or addition of one or more other features, entities, steps, operations, elements, components, and/or collections thereof.

It should also be understood that the terms used in the specification of the present disclosure are merely intended to describe specific embodiments rather than to limit the present disclosure. As being used in the specification and the claims of the disclosure, unless the context clearly indicates otherwise, singular forms "a", "an", and "the" are intended to include plural forms. It should also be understood that a term "and/or" used in the specification and the claims refers to any and all possible combinations of one or more of relevant listed items and includes these combinations.

The embodiments of the present disclosure have been described in detail above. Specific examples have been used in the specification to explain the principles and implementations of the present disclosure. The descriptions of the above embodiments are only used to facilitate understanding of the method and core ideas of the present disclosure. At the same time, persons of ordinary skill in the art may change or transform the implementation and application scope according to the ideas of the present disclosure. The changes and transformations shall all fall within the protection scope of the present disclosure. In summary, the content of this specification should not be construed as a limitation on the present disclosure.

What is claimed:

1. An acceleration unit, comprising M acceleration cards of the acceleration unit, wherein
   each acceleration card of the M acceleration cards of the acceleration unit includes an internal connection port, and
   each acceleration card of the M acceleration cards of the acceleration unit is connected to other acceleration cards of the M acceleration cards of the acceleration unit through the internal connection port, wherein
      the M acceleration cards of the acceleration unit logically form an acceleration card matrix with a scale of L*N, and L and N are integers not less than 2.

2. The acceleration unit of claim 1, wherein the M acceleration cards of the acceleration unit logically form one of a 2*2, 3*3, and 4*4 acceleration card matrix.

3. The acceleration unit of claim 1, wherein each acceleration card of the M acceleration cards of the acceleration unit is connected with at least one other acceleration card of the M acceleration cards of the acceleration unit through two paths.

4. The acceleration unit of claim 1, wherein acceleration cards of the acceleration unit at opposite corners of the acceleration card matrix are connected through two paths.

5. The acceleration unit of claim 1, wherein at least one acceleration card of the M acceleration cards of the acceleration unit includes an external connection port.

6. The acceleration unit of claim 1, wherein,
   the acceleration unit includes four acceleration cards of the acceleration unit,
   each acceleration card of the four acceleration cards of the acceleration unit includes six ports, wherein
      four ports of each acceleration card of the four acceleration cards of the acceleration unit are internal connection ports to connect with other three acceleration cards of the four acceleration cards, and
      remaining two ports of each acceleration card of the four acceleration cards of the acceleration unit are external connection ports to connect with acceleration cards of other acceleration units.

7. The acceleration unit of claim 1, wherein the internal connection ports and external connection ports are SerDes ports.

8. The acceleration unit of claim 1, wherein the acceleration unit is configured to perform a reduction operation on data in each acceleration card of the M acceleration cards to obtain a reduction result.

9. The acceleration unit of claim 4, wherein
   the acceleration card matrix includes two independent rings, and
   each ring of the two independent rings completes a part of operations.

10. An acceleration assembly, comprising a plurality of acceleration units, wherein
    each acceleration unit of the plurality of acceleration units includes M acceleration cards of the corresponding acceleration unit,
    each acceleration card of the M acceleration of the corresponding acceleration unit includes an internal connection port, and
    each acceleration card of the M acceleration cards of the corresponding acceleration unit is connected to other acceleration cards of the M acceleration cards of the corresponding acceleration unit through the internal connection port, wherein
       the M acceleration cards of the M acceleration cards of the corresponding unit logically form an acceleration card matrix with a scale of L*N, and L and N are integers not less than 2,
       at least one acceleration card of the M acceleration cards of the corresponding acceleration unit includes an external connection port, and
       the plurality of acceleration units are connected through the external connection port.

11. The acceleration assembly of claim 10, wherein the M acceleration cards of the corresponding acceleration unit logically form a 2*2, 3*3, and 4*4 acceleration card matrix.

12. The acceleration assembly of claim 10, wherein each acceleration card of the M acceleration cards of the corresponding acceleration unit is connected with at least one other acceleration card of the M acceleration cards of the corresponding acceleration unit through two paths.

13. The acceleration assembly of claim 10, wherein acceleration cards of the M acceleration cards of the corresponding acceleration unit at opposite corners of the acceleration card matrix are connected through two paths.

14. The acceleration assembly of claim 1, wherein,
    at least one acceleration unit of the plurality of acceleration units includes four acceleration cards of the acceleration unit, and
    each acceleration card of the four acceleration cards of the acceleration unit includes six ports, wherein
       four ports of each acceleration card of the four acceleration cards of the acceleration unit are internal connection ports to connect with other three acceleration cards of the acceleration unit, and
       remaining two ports of each acceleration card of the four acceleration cards of the acceleration unit are external connection ports to connect with acceleration cards of other acceleration units of the plurality of acceleration units.

15. The acceleration assembly of claim 10, wherein the internal connection ports and external connection ports are SerDes ports.

16. The acceleration assembly of claim 10, wherein
    the plurality of acceleration units are logically in a multi-layer structure, each layer of the multi-layer structure includes an acceleration unit of the plurality of accelerations units, and at least one acceleration card of the M acceleration cards of each acceleration unit of the plurality of acceleration units is connected to acceleration cards of other acceleration units of the plurality of acceleration units through an external connection port.

17. The acceleration assembly of claim 10, wherein the plurality of acceleration units have a same structure.

18. The acceleration assembly of claim 10, wherein each acceleration unit is configured to perform a reduction operation on data in each acceleration card of the M acceleration cards of the corresponding acceleration unit to obtain a reduction result.

19. The acceleration assembly of claim 10, wherein the acceleration assembly is configured to:

perform a first reduction operation on data in acceleration cards of a same acceleration unit of the plurality of acceleration units to obtain a first reduction result in each acceleration unit of the plurality of acceleration units; and perform a second reduction operation on the first reduction result in the plurality of acceleration units to obtain a second reduction result.

20. An acceleration device, comprising a plurality of acceleration units, wherein each acceleration unit of the plurality of acceleration units includes M acceleration cards of the corresponding acceleration unit, each acceleration card of the M acceleration cards of the corresponding acceleration unit includes an internal connection port, each acceleration card of the M acceleration cards of the corresponding acceleration unit is connected to other acceleration cards of the acceleration cards of the corresponding acceleration unit through the internal connection port, the M acceleration cards of the corresponding acceleration unit logically form an acceleration card matrix with a scale of L*N, and L and N are integers not less than 2, at least one acceleration card of the M acceleration cards of the corresponding acceleration unit includes an external connection port, and the plurality of acceleration units are connected through the external connection port, wherein the plurality of acceleration units are logically in a multi-layer structure, each layer of the multi-layer structure includes an acceleration unit, at least one acceleration card of the M acceleration cards of each acceleration unit of the plurality of acceleration units is connected to acceleration cards of other acceleration units of the plurality of acceleration units through an external connection port, a last acceleration unit of the plurality of acceleration units is connected to a first acceleration unit of the plurality of acceleration units, and the plurality of acceleration units are connected end to end to form a ring structure.

21. The acceleration device of claim 20, wherein the M acceleration cards of the corresponding acceleration unit logically form a 2*2, 3*3 and 4*4 acceleration card matrix.

22. The acceleration device of claim 20, wherein each acceleration card of the M acceleration cards of the corresponding acceleration unit is connected with at least one other acceleration card of the M acceleration cards of the corresponding acceleration unit through two paths.

23. The acceleration device of claim 20, wherein acceleration cards of the M acceleration cards of the corresponding acceleration unit at opposite corners of the acceleration card matrix are connected through two paths.

24. The acceleration device of claim 20, wherein, at least one acceleration unit of the plurality of acceleration units includes four acceleration cards of the acceleration unit, each acceleration card of the four acceleration cards of the acceleration unit includes six ports, wherein four ports of each acceleration card of the four acceleration cards of the acceleration unit are internal connection ports to connect with other three acceleration cards of the four acceleration cards of the acceleration unit, and remaining two ports of each acceleration card of the four acceleration cards of the acceleration unit are external connection ports to connect with acceleration cards of other acceleration units of the plurality of acceleration units.

25. The acceleration device of claim 20, wherein the internal connection ports and external connection ports are SerDes ports.

26. The acceleration device of claim 20, wherein the acceleration device is configured to:

perform a first reduction operation on data in acceleration cards of a same acceleration unit of the plurality of acceleration units to obtain a first reduction result in each acceleration unit of the plurality of acceleration units; and perform a second reduction operation on the first reduction result in the plurality of acceleration units to obtain a second reduction result.

27. An acceleration device, comprising a plurality of acceleration assemblies of claim 10, wherein the plurality of acceleration assemblies are connected to each other through idle external connection ports.

28. The acceleration device of claim 27, wherein the acceleration device includes four acceleration assemblies, each acceleration assembly of the four acceleration assemblies includes:

a first acceleration unit; and a second acceleration unit, and each acceleration assembly of the four acceleration assemblies is interconnected with one of a first acceleration unit and a second acceleration unit of other acceleration assembly of the four acceleration assemblies through one of the first acceleration unit and the second acceleration unit of each acceleration assembly.

29. The acceleration device of claim 28, wherein each acceleration assembly of the four acceleration assemblies is interconnected to one of the first acceleration unit and the second acceleration unit of other acceleration assembly of the four acceleration assemblies using at least two paths through one of the first acceleration unit and the second acceleration unit of each acceleration assembly.

30. The acceleration device of claim 28, wherein the four acceleration assemblies include a first acceleration assembly, a second acceleration assembly, a third acceleration assembly, and a fourth acceleration assembly, wherein a second pair of acceleration cards of a first acceleration unit of the first acceleration assembly is connected to a second pair of acceleration cards of a second acceleration unit of the second acceleration assembly;

a first pair of acceleration cards of the second acceleration unit of the second acceleration assembly is connected to a first pair of acceleration cards of a first acceleration unit of the third acceleration assembly;

a second pair of acceleration cards of a second acceleration unit of the third acceleration assembly is connected to a second pair of acceleration cards of a first acceleration unit of the fourth acceleration assembly; and a first pair of acceleration cards of the first acceleration unit of the fourth acceleration assembly is connected to a first pair of acceleration cards of a second acceleration unit of the first acceleration assembly.

31. The acceleration device of claim 30, wherein a first pair of acceleration cards and a second pair of acceleration cards in different acceleration units of the plurality of acceleration units in a same acceleration assembly of the four acceleration assemblies are indirectly connected.

32. The acceleration device of claim 27, wherein the acceleration device includes the plurality of acceleration assemblies connected in a ring, a second acceleration unit of each acceleration assembly of the plurality of acceleration assemblies is connected to a first acceleration unit of a next acceleration assembly of the plurality of acceleration assemblies, and the plurality of acceleration assemblies are connected end to end.

33. The acceleration device of claim 27, wherein the acceleration device is configured to:

perform a first reduction operation on data in acceleration cards of a same acceleration unit of the plurality of acceleration units to obtain a first reduction result;

perform an intermediate reduction operation on the first reduction result in the plurality of acceleration units of a same acceleration assembly of the plurality of acceleration assemblies to obtain an intermediate reduction result; and perform a second reduction operation on the intermediate reduction result in the plurality of acceleration assemblies to obtain a second reduction result.

* * * * *